(12) United States Patent
Aurongzeb et al.

(10) Patent No.: US 11,666,821 B2
(45) Date of Patent: Jun. 6, 2023

(54) THERMO-HAPTICS FOR A POINTING DEVICE FOR GAMING

(71) Applicant: Dell Products, LP, Round Rock, TX (US)

(72) Inventors: Deeder M. Aurongzeb, Austin, TX (US); Peng Lip Goh, Singapore (SG)

(73) Assignee: Dell Products, LP, Round Rock, TX (US)

( * ) Notice: Subject to any disclaimer, the term of this patent is extended or adjusted under 35 U.S.C. 154(b) by 203 days.

(21) Appl. No.: 17/112,015

(22) Filed: Dec. 4, 2020

(65) Prior Publication Data

US 2022/0176240 A1    Jun. 9, 2022

(51) Int. Cl.
*A63F 13/285* (2014.01)
*G06N 20/00* (2019.01)

(52) U.S. Cl.
CPC .......... *A63F 13/285* (2014.09); *G06N 20/00* (2019.01)

(58) Field of Classification Search
CPC .................................................. A63F 13/285
See application file for complete search history.

(56) References Cited

U.S. PATENT DOCUMENTS

| 10,613,630 | B2 | 4/2020 | Omote | |
| 2002/0030663 | A1* | 3/2002 | Tierling | ................ B06B 1/0276 345/156 |
| 2002/0133264 | A1 | 9/2002 | Maiteh | |
| 2003/0210259 | A1 | 11/2003 | Liu | |
| 2008/0111791 | A1 | 5/2008 | Nikittin | |
| 2009/0040175 | A1 | 2/2009 | Xu | |
| 2010/0315335 | A1 | 12/2010 | Villar | |
| 2014/0028547 | A1 | 1/2014 | Bromley | |
| 2016/0132116 | A1* | 5/2016 | Grant | ...................... G06F 3/016 345/156 |

(Continued)

FOREIGN PATENT DOCUMENTS

WO    2019/148505 A1    8/2019

*Primary Examiner* — Thomas J Hong
*Assistant Examiner* — Carl V Larsen
(74) *Attorney, Agent, or Firm* — Prol Intellectual Property Law, PLLC; H. Kenneth Prol

(57) ABSTRACT

An information handling system may include a processor, a data storage device, a power management unit, a thermo-haptic mouse, including an array of thermoelectric generators of a thermo-haptic module to selectively heat or cool a portion of the thermo-haptic mouse to be felt by a user of the thermo-haptic mouse, and a piezoelectric actuator of the thermo-haptic module to selectively apply a vibration to the portions of the thermo-haptic mouse to be felt by the user of the thermo-haptic mouse, and the processor executing code of a mouse training machine learning system to: receive, as training input, captured images during the execution of a gaming application and provide, as output, image recognition dataset descriptive of recognized game action event environmental data during execution of the gaming application, the image recognition dataset to be used by the processor executing a thermo-haptic feedback model evaluation system to provide thermo-haptic signals to the array of thermoelectric generators and the piezoelectric actuator to provide thermo-haptic feedback commensurate with the game action event environment during game play.

20 Claims, 10 Drawing Sheets

(56) References Cited

U.S. PATENT DOCUMENTS

| | | | |
|---|---|---|---|
| 2016/0202760 A1* | 7/2016 | Churikov | G06F 3/0416 |
| | | | 345/173 |
| 2017/0371432 A1 | 12/2017 | Gavriliuc | |
| 2019/0126141 A1* | 5/2019 | Monastyrskyy | G06F 3/03543 |
| 2019/0243454 A1 | 8/2019 | Chia-chieh | |
| 2020/0341552 A1* | 10/2020 | Yi | A63F 13/24 |
| 2021/0141459 A1* | 5/2021 | Wang | A63F 13/285 |
| 2021/0402292 A1* | 12/2021 | Chow | G02B 27/017 |

\* cited by examiner

US 11,666,821 B2

THERMO-HAPTICS FOR A POINTING DEVICE FOR GAMING

FIELD OF THE DISCLOSURE

The present disclosure generally relates to immersive gaming platform experiences. The present disclosure more specifically relates to thermal and vibrational haptic feedback to a user during operation of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include a mouse or other pointing device used by the user to provide input to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
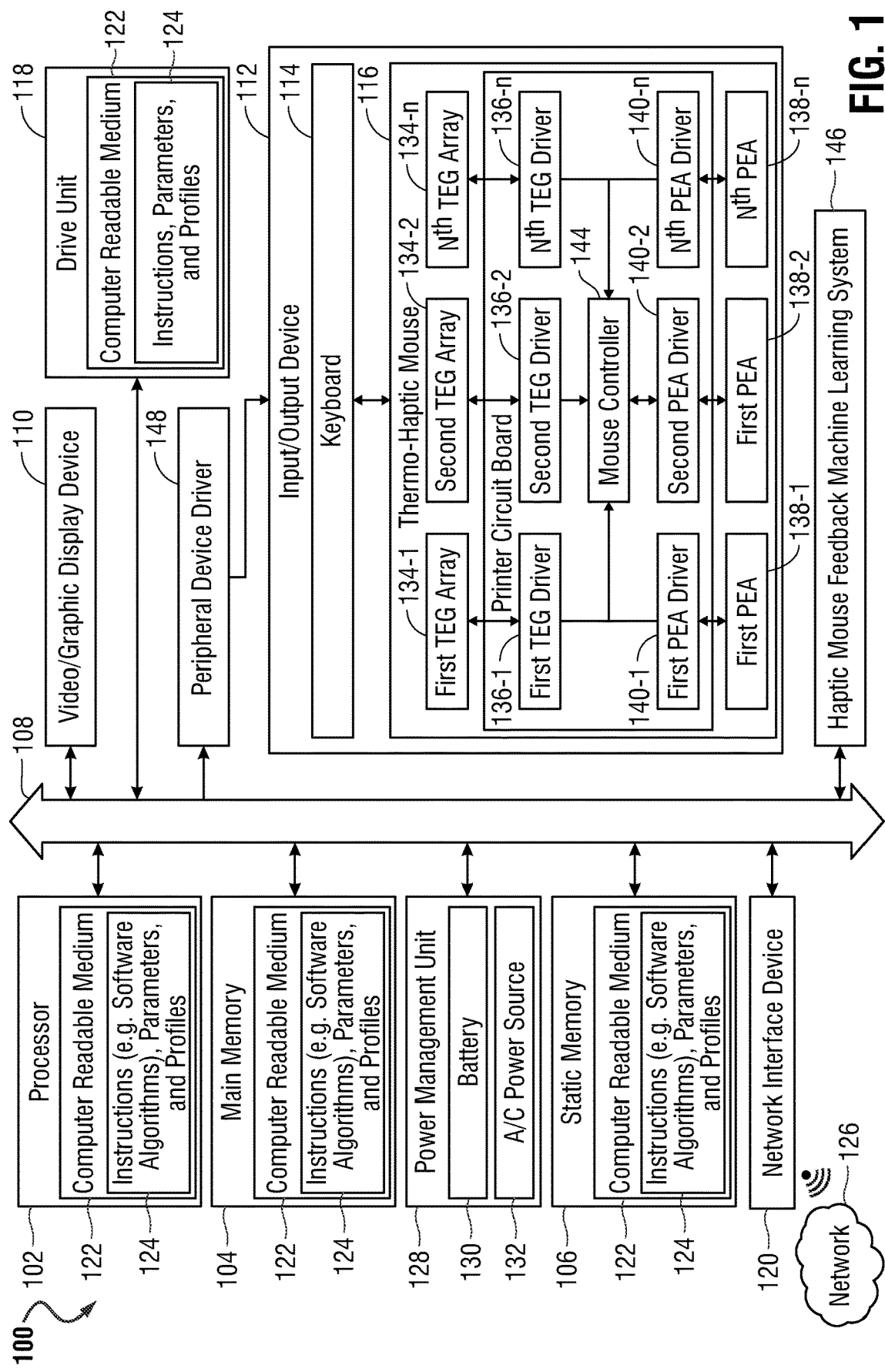
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for an information handling system, that includes a processor, a data storage device, and a power management unit, used to control the actuation of a thermo-haptic mouse. In an embodiment, the thermo-haptic mouse may include an array of thermoelectric generators (TEG array) of a thermo-haptic module to selectively heat or cool a portion of the thermo-haptic mouse to be felt by a user of the thermo-haptic mouse. In an embodiment, the thermo-haptic mouse may include a piezoelectric actuator (PEA) of the thermo-haptic module to selectively apply a vibration to the portions of the thermo-haptic mouse to be felt by the user of the thermo-haptic mouse. The TEG array and PEA may be operatively coupled together to form the thermo-haptic module. In an embodiment, the information handling system may include a mouse training machine learning system to receive, as training input, captured images during the execution of a gaming application and provide, as output, image recognition dataset descriptive of recognized game action event environmental data during execution of the gaming application, the image recognition dataset to be used by the processor executing a thermo-haptic feedback model evaluation system to provide thermo-haptic signals to the array of thermoelectric generators and the piezoelectric actuator to provide thermo-haptic feedback commensurate with the game action environment during game play.

In an embodiment, the information handling system may, with the execution of the thermo-haptic feedback model evaluation system by the processor, determine if a threshold accuracy of the output image recognition dataset has been reached before use of the output image recognition dataset by the processor for thermo-haptic feedback during execution of the gaming application. Where the accuracy threshold is not reached, the processor may iteratively reevaluate the accuracy of additional image recognition datasets until the accuracy of the image recognition dataset has reached the accuracy threshold. Where the accuracy threshold is reached, the processor may load, and execute the recognition dataset with the processor during game play and activate the array of thermoelectric generators and piezoelectric actuators via generated thermoelectric feedback signals or haptic feedback signals.

In an embodiment, the array of thermoelectric generators may be arranged within an interior of a portion of the thermo-haptic mouse to provide a plurality of hot and cold thermal zones across a surface of the thermo-haptic mouse to be touched by the user. In an embodiment, the thermoelectric generators may include a flexible substrate to allow the array of thermoelectric generators to contour against an interior surface of a housing of the thermo-haptic mouse to be held by the user, the flexible substrate being made of polyimide. In an embodiment, a pairing of a piezoelectric actuator to each thermoelectric generator may be made with the piezoelectric actuators being placed below the thermoelectric generators sandwiching the thermoelectric generators between the piezoelectric actuators and an interior surface of a housing of the thermo-haptic mouse.

In an embodiment, the thermo-haptic mouse may further comprise a dedicated printed circuit board including a thermoelectric driver for the array of thermoelectric generators and a piezoelectric actuator driver for a plurality of piezoelectric actuators. In an embodiment, the thermoelectric drivers and piezoelectric drivers may be operatively coupled to a controller on a mouse printed circuit board to receive the signals. In an embodiment, each thermoelectric generator may further comprise a series of p-doped and n-doped semiconductors to receive a voltage from the power management unit to selectively cool one or more of the semiconductors.

The present specification further describes a thermo-haptic feedback pointing device operatively coupled to an information handling system. The thermo-haptic feedback pointing device may include at least one input button, a housing including a palm rest housing, and a motion tracking system to track movement of the thermo-haptic feedback pointing device. Further, the thermo-haptic feedback device may include a controller for operating motion tracking, button selection, scroll wheel or other scroll function, and other aspects of a mouse pointing device in the embodiments described herein. The thermo-haptic feedback pointing device may further include a controller to receive output data from a processor of the information handling system. In an embodiment, the thermo-haptic feedback pointing device may include a thermoelectric driver operatively coupled to an array of thermoelectric generator elements to receive signals from the controller to selectively heat or cool portions of the thermo-haptic feedback pointing device to be felt by the user of the thermo-haptic feedback pointing device, the plurality of thermoelectric generators including a flexible substrate to allow the plurality of thermoelectric generators to contour against an interior surface of the palm rest housing of the thermo-haptic feedback pointing device. The thermo-haptic feedback pointing device may also include a piezoelectric driver operatively coupled to a piezoelectric actuator to selectively apply a vibration to the portions of the thermo-haptic feedback pointing device to be felt by the user of the thermo-haptic feedback pointing device. In an embodiment, the thermo-haptic feedback pointing device receives instructions to activate the piezoelectric actuator and array of thermoelectric generators originating from a haptic feedback machine learning system.

In an embodiment, the thermo-haptic feedback pointing device may include pairing of a piezoelectric actuator to each array of thermoelectric generators, the piezoelectric actuator being placed below each array of thermoelectric generators sandwiching the array of thermoelectric generators between the piezoelectric actuator and an interior surface of the palm rest housing of the thermo-haptic feedback pointing device. In an embodiment, the thermo-haptic feedback pointing device may include a dedicated printed circuit board including a plurality of thermoelectric drivers for each of the array of thermoelectric generators to render a thermo-haptic feedback across a plurality of arrays of thermoelectric generators.

In an embodiment, the thermo-haptic feedback pointing device may include a dedicated printed circuit board including a plurality of piezoelectric actuator drivers for each of a plurality of piezoelectric actuators to render a vibration haptic feedback across a plurality of piezoelectric actuators.

In an embodiment, the thermo-haptic feedback pointing device may include a wired connection with the information handling system, the wired connection including signal and power lines to the controller of the thermo-haptic feedback pointing device. In an embodiment, the thermo-haptic feedback pointing device may include a wireless transceiver to send and receive data from the information handling system and a battery to power the controller, thermoelectric generators, and piezoelectric actuators.

The thermo-haptic feedback pointing device, in an embodiment, may include forming various heat and cold zones on a surface the housing of the thermo-haptic feedback pointing device by arranging a plurality of thermoelectric generators against the interior surface of a palm rest housing of the thermo-haptic feedback pointing device to concurrently heat or cool one or more of the heat and cold zones.

The present specification further describes a thermo-haptic feedback pointing device operatively coupled to an information handling system that includes at least one input button, a housing including a palm rest housing, and a motion tracking system to track movement of the thermo-haptic feedback pointing device. The thermo-haptic feedback pointing device may further include a controller to send input data or to receive output data from a processor of the information handling system. The thermo-haptic feedback pointing device may also include, in an embodiment, a thermoelectric driver operatively coupled to an array of thermoelectric generator to receive signals from the controller to selectively heat or cool portions of the thermo-haptic feedback pointing device to be felt by the user of the thermo-haptic feedback pointing device, the plurality of thermoelectric generators including a flexible substrate to allow the plurality of thermoelectric generators to contour against an interior surface of the palm rest housing of the thermo-haptic feedback pointing device. In an embodiment, the thermo-haptic feedback pointing device may include a piezoelectric driver operatively coupled to a piezoelectric actuator to selectively apply a vibration to the portions of the thermo-haptic feedback pointing device to be felt by the user of the thermo-haptic feedback pointing device.

In an embodiment, the thermo-haptic feedback pointing device may include a dedicated printed circuit board including a plurality of thermoelectric drivers for each of the array of thermoelectric generators to render a thermo-haptic feedback across a plurality of arrays of thermoelectric generators and a plurality of piezoelectric actuator drivers for each of a plurality of piezoelectric actuators to render a vibration haptic feedback across a plurality of piezoelectric actuators.

In an embodiment, the thermo-haptic feedback pointing device may include pairing of a piezoelectric actuator to each array of thermoelectric generators, the piezoelectric actuator being placed below each array of thermoelectric generators sandwiching the array of thermoelectric generators between the piezoelectric actuator and an interior surface of the palm rest housing of the thermo-haptic feedback pointing device. The thermo-haptic feedback pointing device may, in an embodiment, further include a wired connection with the information handling system, the wired connection including signal and power lines to the controller of the thermo-haptic feedback pointing device. In an embodiment, the thermo-haptic feedback pointing device may include a wireless transceiver to send and receive data from the information handling system and a battery to power the controller, thermoelectric generators, and piezoelectric actuators.

In an embodiment, the thermo-haptic feedback pointing device may include discrete heating or cold zones formed on a surface of the palm rest housing of the thermo-haptic feedback pointing device by arranging the plurality of thermoelectric generators against an interior surface of the housing of the thermo-haptic feedback pointing device to concurrently heat or cool one or more of the discrete hot and cold zones. In an embodiment, the thermo-haptic feedback pointing device receives instructions to activate the piezoelectric actuator and array of thermoelectric generators originating from a haptic feedback machine learning system. In another embodiment, the thermo-haptic feedback pointing device may receive instructions to activate piezoelectric actuator and array of thermoelectric generators originating from the gaming application itself.

In the present specification and in the appended claims the term "haptic feedback" is meant to be understood as output to a user that include the application of mechanical haptic forces and changes in temperatures to the user. In the context of the embodiments of the thermo-haptic feedback pointing device described herein, a thermoelectric generator (TEG) may provide the changes in temperature felt by a user as the user touches the thermo-haptic feedback pointing device. Additionally, in the context of the embodiments of the thermo-haptic feedback pointing device, a piezoelectric actuator (PEA) may be used to provide mechanical force such as a vibration at the thermo-haptic feedback pointing device such that the user feels that haptic motion when the user touches the thermo-haptic feedback pointing device. Such haptic motion may be vibration, clicks, bumps, pulsed motion, motion of varying intensity, among others.

FIG. 1 illustrates an information handling system 100 similar to the information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT information handling system, wearable information handling system, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In an example embodiment, the information handling system 100 may include a laptop or desktop gaming system that executes a gaming application. The gaming application may include any computer code that is executed by a processor 102 of the information handling system 100 in order to allow the user to engage with a gaming environment via input/output (I/O) devices 112 such as the thermo-haptic mouse 116, a keyboard 114, a video/graphics display device 110 or any other input or output device. The thermo-haptic mouse 116, as described herein, may further provide haptic feedback to the user in order to further immerse the user into the action presented to the user via the execution of the gaming application. This haptic feedback may originate from the selective activation of one or more TEG arrays 134-1, 134-2, 134-3 that heat at or cool a portion of a housing of the thermo-haptic mouse 116. A TEG array 134-1, 134-2, 134-3 may include a two or more TEGs that, in the embodiments herein, include a p-doped and n-doped semiconductor sandwiched between a top electric insulator and bottom electric insulator both made of, for example, a ceramic. In the present specification and in the appended claims, a TEG array 134-1, 134-2, 134-3 is defined as a group of TEGs that may or may not be coupled in series.

Additional haptic feedback may originate from the selective activation of one or more PEAs 138-1, 138-2, 138-$n$ that produce vibrations against the portion of the housing. These types of haptic feedback may be coordinated with actions conducted in the gaming environment displayed on the video/graphics display device 110 during execution of the gaming application. Various example gaming environments may result in how the TEG arrays 134-1, 134-2, 134-3 and PEAs 138-1, 138-2, 138-$n$ provide the haptic feedback to the user through the thermo-haptic mouse 116. Details of the activation of the TEG arrays 134-1, 134-2, 134-3 and PEAs 138-1, 138-2, 138-$n$ based on the gaming environment are described in more detail herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video, or data communication. For example, an information handling system 100 may be any mobile or other information handling system capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU) such as processor 102, a graphics processing unit (GPU), hardware or software control logic, or any combination thereof. Additional components of the information handling system 100 can include one or more storage devices, one or more communications ports for communicating with external devices, as well as, various input and output (I/O) devices 112, such as the keyboard 114, the thermo-haptic mouse 116, a video/graphics display device 110, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the haptic mouse feedback machine learning system 146, and gaming application, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices 112.

The information handling system 100 may further include a video/graphics display device 110. The video/graphics display device 110 in an embodiment may function as a liquid crystal display (LCD), an organic light emitting diode (OLED), a flat panel display, or a solid-state display. Additionally, the information handling system 100 may include an input device 112, such as a cursor control device (e.g., touchpad, or gesture or touch screen input, a keyboard 114 and the thermo-haptic mouse 116). The thermo-haptic mouse 116 described herein may be both an input device and an output device with the user of the thermo-haptic mouse 116 providing input to the information handling system 100 via one or more buttons on the thermo-haptic mouse 116 and receiving output at the thermo-haptic mouse 116 in the form of the haptics described herein. The information handling system 100 can also include a disk drive unit 116.

The network interface device (NID) 120 of the information handling system 100 can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The NID 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one NID 120 may operate two or more wireless links.

The NID 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in one or more bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. The NID 120 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) executing an evolved packet core of an existing LTE system, or a Next Generation Node B (gNodeB) executing the next generation packet core of the 5G cellular standard.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video, or data over the network 128. Further, the instructions 124 may be transmitted or received over the network 128 via the network interface device or NID 120.

The information handling system 100 can include a set of instructions 124 that can be executed to cause the computer system to perform any one or more of the methods or computer-based functions disclosed herein. For example, instructions 124 may execute a haptic mouse feedback machine learning system 146, a peripheral device driver 148, software agents, or other aspects or components. In various embodiments herein, the instructions 124 may execute any type of gaming applications. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the haptic mouse feedback machine learning system 146 and peripheral device driver 148 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some of or all the haptic mouse feedback machine learning system 146 and peripheral device driver 148 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The haptic mouse feedback machine learning system 146 and peripheral device driver 148 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system such as a bank of fans, one or more drive units 114, a graphical processing unit (GPU), the video/graphic display device 110, and other components that may require power when a power button has been actuated by a user. In an embodiment, the PMU 128 may be electrically coupled to the bus 108 to provide this power. The PMU 128 may regulate power from a power source such as a battery 130 or A/C power adapter 132. In an embodiment, the battery 130 may be charged via the A/C power adapter 132 and provide power the to the components of the information handling system 100 when A/C power from the A/C power adapter 132 is removed.

As described, the information handling system 100 may also include a haptic mouse feedback machine learning system 146 that may be operably connected to the bus 108. The computer readable medium 122 associated with the haptic mouse feedback machine learning system 146 may also contain space for data storage. The haptic mouse feedback machine learning system 146 may, according to the present description, perform tasks related to providing, as output, an image recognition dataset descriptive of recognized game action event environmental data that is experienced during execution of the gaming application. The image recognition dataset may be used by the processor 102 executing a thermo-haptic feedback model evaluation system to provide thermo-haptic signals to a TEG array 134-1, 134-2, 134-3 and one or more piezoelectric actuators (PEAs) 138-1, 138-2, 138-$n$ to provide thermo-haptic feedback commensurate with the game action environment experienced during game play. This may be done in real-time as the user engages with the gaming environment. In the present specification and in the appended claims, the term "thermo-haptic feedback" is meant to be any changes in temperature, vibration, or both felt by a user due to the activation of one or more of the TEG arrays 134-1, 134-2, 134-$n$ and PEAs 138-1, 138-2, 138-$n$.

In an embodiment, the haptic mouse feedback machine learning system 146 may be trained by receiving, as training input, captured images obtained during the execution of a gaming application. These captured images may be from any angle within the environment and may, in some embodiments, include an avatar. In the present specification and in the appended claims, the term "avatar" is meant to include any graphical representation of a user, a user's character, or a persona placed within or interacting within the gaming environment. The captured images used to train the haptic mouse feedback machine learning system 146 may also include representations of other environmental characteristics such as objects, actions, or other environmental characteristics. A non-exhaustive list of environmental characteristics may include a weapon firing, an explosion, an avatar being struck, an avatar's interaction with objects within the gaming environment (cold snow, warm sand, shaking ground, etc.), noises, light, among other environmental characteristics. Each of these types of environmental characteristics may be captured in an image during, in an embodiment, a training period. The training period may be conducted during execution of the gaming application by the processor 102. This training period may be a dedicated duration of time whether during actual gaming interactions by the user or not. For example, during execution of the gaming application, the user may be directed by the gaming application to engage in a "demo" portion of the gaming environment that allows the processor 102 to capture the images and provide those images to the haptic mouse feedback machine learning system 146. Alternatively, or additionally, the images may be captured by the processor 102 during execution of the gaming application and during actual game play by the user. In this embodiment, the haptic mouse feedback machine learning system 146 may be trained while the user engages in the interaction with the gaming environments thereby allowing the output from the haptic mouse feedback machine learning system 146 to be more refined the longer the player engages with that gaming environment.

In an embodiment, the haptic mouse feedback machine learning system 146 may be code instructions and operate with the main memory 104, the processor 102, the video display 110, the alpha-numeric input device 112, and the NID 120 via bus 108, and several forms of communication may be used, including ACPI, SMBus, a 24 MHZ BFSK-coded transmission channel, or shared memory. Driver software, firmware, controllers, and the like may communicate with applications on the information handling system 100. During this process and after the haptic mouse feedback machine learning system 146 has been trained, the processor 102 may receive the output from the haptic mouse feedback machine learning system 146 that defines the image recognition dataset descriptive of recognized game action event environmental data during execution of the gaming application. Upon receipt of this dataset, the processor 102 may execute a model evaluation system. The model evaluation system may be computer code or may be an ASIC that evaluates the accuracy of the image recognition dataset to determine whether the accuracy reaches a threshold. For example, the model evaluation system may determine whether the environmental characteristics represent those environmental characteristics of a game action that could be presented at the thermo-haptic mouse 116 as thermo-haptic feedback to the user. Where the model evaluation system has determined that the output from the haptic mouse feedback machine learning system 146 has reached a threshold accuracy, the processor 102 causes signals to be sent to the TEG arrays 134-1, 134-2, 134-n and PEAs 138-1, 138-2, 138-n to provide this thermo-haptic feedback described herein.

In order to send the thermo-haptic signals from the processor 102, the information handling system 100 may implement a peripheral device driver 148. The peripheral device driver 148 may include any computer code that operates to control the thermo-haptic mouse 116 by relaying signals from the processor 102 to a mouse controller 144. The mouse controller 144 may execute more functions such as cursor location, click selection, scroll functions and others as understood for mouse pointing device operation according to embodiments herein. The mouse controller 144 may further control the relaying of the thermo-haptic signals from the processor 102 to each of the piezoelectric actuator (PEA) drivers 140-1, 140-2, 140-n and thermoelectric generator (TEG) drivers 136-1, 136-2, 136-n. Similar to the peripheral device driver 148, the TEG drivers 136-1, 136-2, 136-n and PEA drivers 140-1, 140-2, 140-n may include computer code that, when executed by the mouse controller 144, selectively activates the respective operatively coupled TEG arrays 134-1, 134-2, 134-n and PEAs 138-1, 138-2, 138-n. Each of the TEG arrays 134-1, 134-2, 134-n may be operatively coupled to the mouse controller 144 via a serial connector, for example, formed on a printed circuit board (PCB) 142. The PCB 142 may, in an embodiment, be a dedicated PCB 142 apart from a PCB used to mount the mouse controller 144 and which serves as a PCB for other functions on the thermo-haptic mouse 116 such as the button actuators, a position tracking system (e.g., trackball, optical systems, gyroscopes, etc.), scroll functions, and the like.

The TEG arrays 134-1, 134-2, 134-n may be arranged in a way to impart a heating effect or chilling effect on a surface of a housing of the thermo-haptic mouse 116. This may include those surfaces of the thermo-haptic mouse 116 that the user may touch. The TEG arrays 134-1, 134-2, 134-n may, in an embodiment, may form zones across the surface of the thermo-haptic mouse 116 that can be individually heated or cooled.

In an embodiment, each of the TEG arrays 134-1, 134-2, 134-n may be an array of TEGs formed on a flexible substrate. For example, a first TEG array 134-1 may include a plurality of TEGs that each includes a p-doped and n-doped semiconductor sandwiched between a top electric insulator and bottom electric insulator both made of, for example, a ceramic. Each of the of p-doped and n-doped semiconductors may be soldered between two ceramic plates and placed electrically in series and thermally in parallel to each other to form each of the TEGs. In an embodiment, the TEG arrays 134-1, 134-2, 134-3 may operate using the Peltier effect, also known as the thermoelectric effect, where application of a voltage to the p-doped and n-doped semiconductor pairs causes a change in temperature. In these embodiments, the top and bottom electric insulators may be either heated or chilled based on an amount of voltage or polarity of voltage applied at a TEG lead operatively coupled to the array of TEG arrays 134-1, 134-2, 134-3.

In another embodiment, a second TEG array 134-2 may also include sets of p-doped and n-doped semiconductor sandwiched between a top electric insulator and bottom electric insulators. These sets of p-doped and n-doped semiconductors may be operatively coupled together in series to receive a voltage at the first TEG lead. In this embodiment, the sets of semiconductors, each forming a TEG, may be arranged in series and be activated together to either heat or chill the housing of the thermo-haptic mouse 116 together depending on magnitude or voltage applied via the first TEG lead and a second TEG lead.

In an embodiment, the second TEG array 134-2, for example, may include a first set of TEGs coupled to a first TEG lead (forming a first array of TEGs) with a second set of TEGs coupled to a second first TEG lead (forming a second array of TEGs). Each of the first and second sets of TEGs may be operatively coupled to a flexible substrate such that the first and second sets of TEGs are placed adjacent to an interior surface of the housing of the thermo-haptic mouse 116. During operation, in this embodiment, the first set of TEGs of the second TEG array 134-2 may be heated or cooled independent of whether the second set of TEGs second TEG array 134-2 is heated or cooled. This may allow the first set of TEGs to be heated and then cooled independently (e.g., sequentially) with the heating and cooling of the second set of TEGs. This, to the perspective of the user, feels like a heat wave has passed across the outer surface of the thermo-haptic mouse 116. As will be described herein, this selective and sequential heating and cooling of the individual TEG arrays may indicate environmental characteristics occurring, in real time, within the gaming environment. By way of example, the gaming application may be a first-person gaming application having a warfare genre. It is understood that these warfare genre games may include explosions represented to the user on the video/graphics display device 110. Because such and explosion, in real life, would pass to and over a user, this environmental characteristic may be recognized by the processor 102 and thermo-haptic feedback model evaluation system as a heat (and vibration) haptic feedback to be represented by at the first TEG array 134-1, the second TEG array 134-2, and any additional TEG array 134-n. Because the heat wave may pass an avatar in a wave motion, each of the TEG arrays 134-1, 134-2, 134-n may be sequentially activated to impart a heat across the surface of housing of the thermo-haptic mouse 116 in a wave action. This may indicate to a user a direction and intensity of explosion that had occurred near the avatar adding to the output received by the user. Similar actions may occur when a cold wave, such as an ice blast, pass an avatar with the TEG arrays 134-1, 134-2, 134-n being selectively activated by the mouse controller 144 to represent a cold wave passing by the avatar. It is appreciated herein that specific use-cases are described that define specific types of environmental characteristics that activate each of the TEG arrays 134-1, 134-2, 134-n in order to provide to a user actions that occurred within the gaming environment. Other use-cases are contemplated herein and described herein further.

As described herein, the thermo-haptic mouse 116 may include one or more PEAs 138-1, 138-2, 138-n. The PEAs 138-1, 138-2, 138-n may be used to impart a vibration or click against an interior surface of the housing of the thermo-haptic mouse 116 to be felt by the user. Like the TEG arrays 134-1, 134-2, 134-n, each of the PEAs 138-1, 138-2, 138-n may be operatively coupled to a PCB 142 via a serial connector that operatively couples the PEAs 138-1, 138-2, 138-n to the mouse controller 144 and processor 102 of the information handling system. Each of the PEAs 138-1, 138-2, 138-n may be concurrently or sequentially activated based, again, on data signals received from the processor 102. For example, the rumble or quake of an avalanche or a structure toppling may impart a moving vibration haptic feedback.

The training of the haptic mouse feedback machine learning system 146 may also provide to the processor those image recognition datasets descriptive of recognized game action event environmental data during execution of the gaming application as output. The thermo-haptic feedback model evaluation system may interpret this output as specific environmental characteristics that have or are occurring during execution of the gaming application. Signals are produced that are used to activate the individual PEAs 138-1, 138-2, 138-n by the mouse controller 144 to represent to the user those environmental characteristics during game play. Again, it is appreciated herein that specific use-cases are described that define specific types of environmental characteristics that activate each of the PEAs 138-1, 138-2, 138-n to provide, to a user, haptic feedback based on actions that occurred within the gaming environment. Other use-cases are contemplated herein and described herein further. Specific examples are presented below in Table 1:

TABLE 1

| Detected Signal | Visual Trigger Condition | Audio Trigger Condition | PEA Behavior | TEG Array Behavior |
| --- | --- | --- | --- | --- |
| Gamer avatar fires a single shot with gun | Avatar gun muzzle image shows large flash burst | Short loud audio spike indicates gun audio wave pattern | Single short pulse at a low intensity | Short temperature spike at low intensity |
| Gamer avatar continually firing gun | Avatar gun point image shows repeated large flash burst | Repeated short loud audio spike indicating gun audio wave pattern | Multiple short pulses until firing ends at a low intensity | Long temperature spike at low intensity |
| Gamer avatar being hit by gunshot | Avatar gun muzzle image shows blood splatter | Short loud audio spike indicating a blood splatter audio wave pattern | Long pulse at high intensity | Long temperature spike at a high intensity |
| Explosion nearby the gamer avatar | Avatar gun muzzle image shows a large flash burst | Short loud audio spike indicating an explosion audio pattern | Long pulse at a high intensity | Long temperature spike at high intensity |
| Enemy bullet landing nearby gamer avatar | Flash burst around (e.g., left side, right side, in front) gamer avatar shows a medium flash burst | Short loud audio spike indicating a gun audio wave pattern | Single short pulse at a high intensity | Short temperature spike at a high intensity |
| Gamer avatar jumps or steps into water | Water splash image shown | Short loud audio spike indicating water splash audio pattern | Multiple short pulses at a low intensity until water splash end | Long cold temperature change at a high intensity |
| Hitting an enemy | Enemy character image pattern shows small flash burst | Short soft audio spike indicating a gun audio wave pattern | Triple short pulses at a high intensity | Short cold temperature change at a high intensity |
| Avatar is in a desert | Lighting in gaming environment is bright and yellow hued continuously | Short, soft audio indicating minimal wing blowing | No vibrations | Long heat temperature change at varying intensities over time |

TABLE 1-continued

| Detected Signal | Visual Trigger Condition | Audio Trigger Condition | PEA Behavior | TEG Array Behavior |
| --- | --- | --- | --- | --- |
| Avatar is in tundra | Lighting in gaming environment is bright and white hued continuously | Long, loud audio indicating sever winds blowing | No vibrations | Long cool temperature change at varying intensities over time |
| Avatar is in an earthquake | Lighting is varied providing little indication of earthquake occurring | Long, loud audio indicating sever shaking of ground | Extreme vibrations at varying intensities over time | No change in temperature |

It is appreciated that the detected signals presented in Table 1 above are not meant to limit the present specification. Indeed, the present specification contemplates that other types of gaming application genres may be executed by the processor 102 and the TEG arrays 134-1, 134-2, 134-n and PEAs 138-1, 138-2, 138-n of the thermo-haptic mouse 116 may be activated to reflect environmental characteristics of gaming action events shown in that gaming environment. These environmental characteristics may include some of those environmental characteristics of gaming action events listed above in Table 1, may include all those environmental characteristics reflected in Table 1, or may include more environmental characteristics than what is reflected in Table 1. The present specification contemplates that this and any example use-case presented herein is not meant to limit the scope of the description or the claims presented herein.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
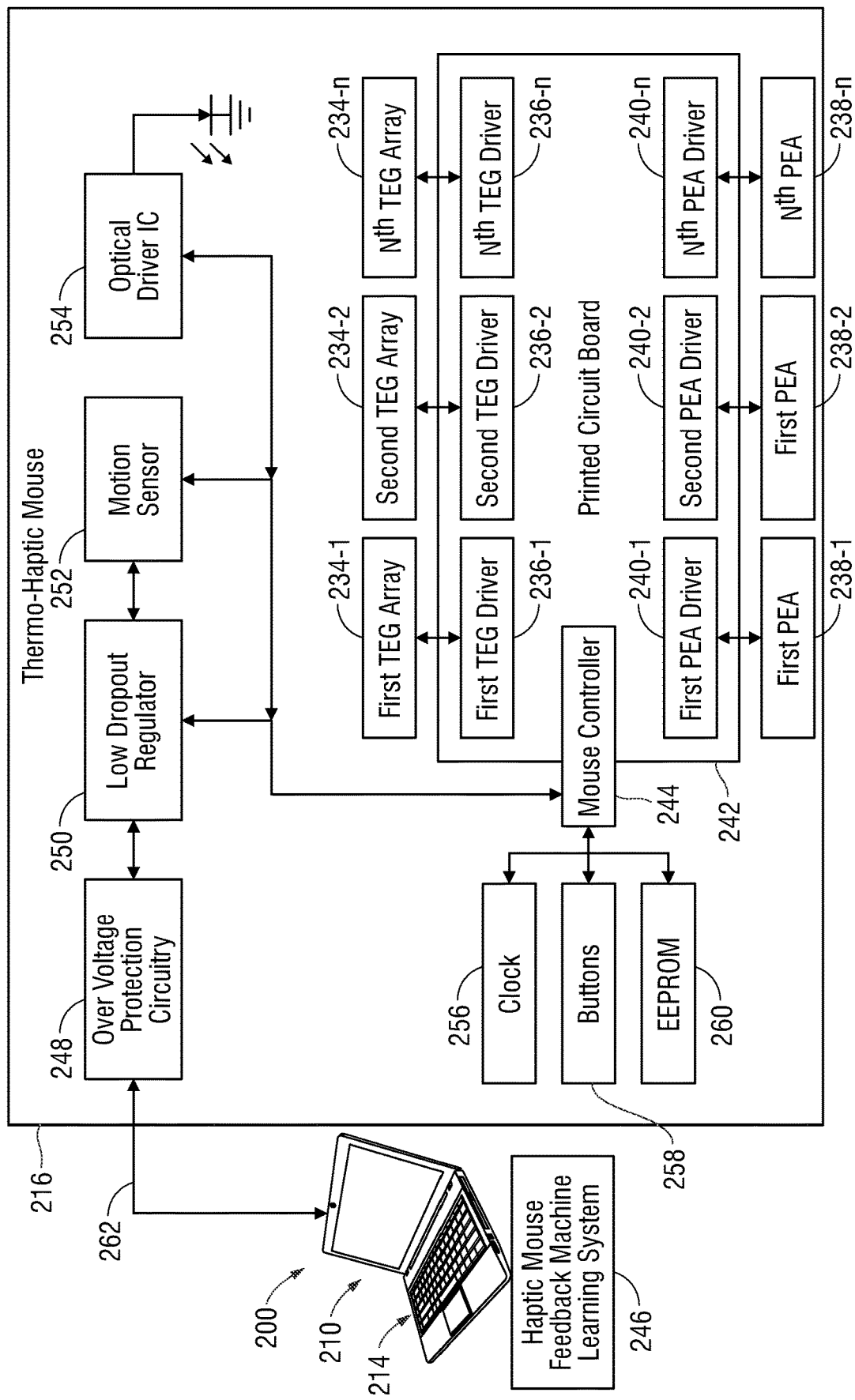
FIG. 2 is a block diagram illustrating an information handling system and a thermo-haptic mouse according to an embodiment of the present disclosure.

FIG. 2 is a block diagram illustrating an information handling system 200 and a thermo-haptic mouse according to an embodiment of the present disclosure. In an embodiment, the information handling system 200 may be operatively coupled to the thermo-haptic mouse 216 via a wired or wireless connection. In an embodiment, the thermo-haptic mouse 216 may be operatively coupled to the information handling system 200 through a stand-alone keyboard (not shown) that helps to relay signals from the processor of the information handling system 200 to the thermo-haptic mouse 216. In this embodiment, operatively coupling the thermo-haptic mouse 216 to the information handling system through the keyboard may reduce the number of ports (e.g., USB ports) necessary to be installed at the information handling system.

In the embodiment where the thermo-haptic mouse 216 is operatively coupled to the information handling system via a wireless connection, the information handling system 200 and thermo-haptic mouse 216 may each include a transceiver to send and receive input and output data according to the embodiments described herein. The thermo-haptic mouse 216 may further include a power source such as a lithium-ion battery used to power the components of the thermo-haptic mouse 216 during operation.

As described, the information handling system 200 may include a video/graphics display device 210 to provide output to the user in the form of a visual display. Additionally, the information handling system 200 may include a keyboard 214 to receive input from a user via one or more keys. FIG. 2 depicts the information handling system 200 as a laptop-type information handling system. However, the present specification contemplates that the information handling system 200 may be any type including a desktop-type information handling system with a display and keyboard in other embodiments.

In the context of the present specification, the video/graphics display device 210 presents a gaming environment to a user. This gaming environment is the output resulting from the execution of a gaming application by the processor of the information handling system 200. In the embodiments described herein, the gaming environment displays certain environmental characteristics and gaming action events. As discussed herein, these environmental characteristics may include objects, avatars, or gaming actions presented to the user. By way of example, the gaming application may be a first-person shooter gaming application. In this example, a character avatar may not be entirely shown on the screen but for some arms that may hold a gun, weapon, kit, or other object that the user may user to interact with other objects within the gaming environment. For example, the user may provide input to the information handling system via the thermo-haptic mouse 216 to move the avatar throughout the gaming environment, interact with an object in the avatar's hand, shoot a gun, swing a weapon, or touch certain other objects within the gaming environment such as snow, water, sand, and the like. Other types of gaming environments are contemplated herein such as those where the avatar is completely viewable by the user. The present specification contemplates that these other types of gaming environments and any specific example presented herein is not meant to limit the scope of the description. For ease of understanding, the examples presented herein may refer specifically to the first-person gaming environment described here.

The information handling system 200 may include a haptic mouse feedback machine learning system 246. The haptic mouse feedback machine learning system 246 may be trained prior to execution of the processor of the information handling system 200 in order to control the PEAs 238-1, 238-2, 238-*n* and TEG arrays 234-1, 234-2, 234-*n*. During execution of the haptic mouse feedback machine learning system 246 by the processor, an image recognition dataset descriptive of recognized game action event environmental data during execution of the gaming application may be developed to train the haptic mouse feedback machine learning system 246. The haptic mouse feedback machine learning system 246 may build one or more mathematical models that provides image recognition datasets descriptive of recognized game action event environmental data during execution of the gaming application. The captured images used as input may be accessible by the processor after the processor has executed the gaming application and recorded these images.

The haptic mouse feedback machine learning system 246 in an embodiment may, upon execution by the processor, determine such correlations in an embodiment based on any machine learning or neural network methodology known in the art or developed in the future. In a specific embodiment, the haptic mouse feedback machine learning system 246 may implement an unsupervised learning or supervised learning technique. For example, the haptic mouse feedback machine learning system 246 in an embodiment may model the relationships between each captured image and action within the gaming environment and result in relationships such as those described in Table 1. The haptic mouse feedback machine learning system 246 may do this using, for example, a layered neural network topology. Such a neural network in an embodiment may include an input layer including a known, recorded set of image values for each of these parameters, settings, indicators, for gaming events in images, and an output layer including an image recognition dataset descriptive of recognized game action event environmental data during execution of the gaming application, based on the known, captured images in the input layer. The haptic mouse feedback machine learning system 246 in an embodiment may propagate input through the layers of the neural network to project or predict the image recognition datasets based on the known and recorded images. Using a back-propagation method, the haptic mouse feedback machine learning system 246, in an embodiment, may then use the captured images to adjust weight matrices of the neural network describing the ways in which image data metrics are likely to affect the image recognition datasets for identification of gaming action events.

With the output layer, the information handling system 200 may provide learned image recognition dataset descriptive of recognized game action event environmental data during execution of the gaming application. The image recognition dataset may be used by the processor of the information handling system 200 executing a thermo-haptic feedback model evaluation system 246 to provide thermo-haptic signals to an array of TEG arrays 234-1, 234-2, 234-*n* and one or more PEAs 238-1, 238-2, 238-*n* to provide thermo-haptic feedback commensurate with the game action event environment during game play.

The thermo-haptic mouse 216 may include one or more TEG arrays 234-1, 234-2, 234-*n*. Each of the TEG arrays 234-1, 234-2, 234-*n* may be operatively coupled to a mouse controller 244 formed on a PCB 242. As described herein, the TEG arrays 234-1, 234-2, 234-*n* may each be operatively coupled to the mouse controller 244 via a TEG driver 236-1, 236-2, 236-*n* that allows the mouse controller 244 to send signals to the TEG arrays 234-1, 234-2, 234-*n* as described herein. As described herein, each of the TEG arrays 234-1, 234-2, 234-*n* may be activated based on the thermo-haptic signals received from the processor at the mouse controller 244.

In an embodiment, one or more of the TEG arrays 234-1, 234-2, 234-*n* may include an array of pairs of p-doped and n-doped semiconductors that are arranged to receive a voltage in order to heat or cool a portion of the housing of the thermo-haptic mouse 216. In an embodiment, these pairs of p-doped and n-doped semiconductors form a single TEG and may each be addressed individually in an embodiment such that neighboring pairs of p-doped and n-doped semiconductors can both heat and cool the housing so that the user can feel changes in temperature across the outer surface of the housing of the thermo-haptic mouse 216. Again, the array of p-doped and n-doped semiconductors may be soldered between two ceramic plates and placed electrically in series and thermally in parallel to each other. In an embodiment, the TEG arrays 234-1, 234-2, 234-3 and each TEG may operate using the Peltier effect, also known as the thermoelectric effect, where application of a voltage to the p-doped and n-doped semiconductor pairs causes a change in temperature by moving the charge carriers within the p-doped and n-doped semiconductors. As described herein, the array of pairs of p-doped and n-doped semiconductors may form a single TEG or may form one or more TEG arrays 234-1, 234-2, 234-*n* based on how the voltage is applied to any given pair or pairs of p-doped and n-doped semiconductors.

In an embodiment, each TEG arrays 234-1, 234-2, 234-*n* may be operatively coupled to a flexible substrate. The flexible substrate may allow the TEG arrays 234-1, 234-2, 234-*n* to be placed against an interior surface of the housing of the thermo-haptic mouse 216. In this embodiment, the flexible substrate allows the TEG arrays 234-1, 234-2, 234-*n* to conform against the interior surface of the housing even where the surface is not flat.

The thermo-haptic mouse 216, in an embodiment, may also include one or more PEAs 238-1, 238-2, 238-*n* operatively coupled to the mouse controller 244. The PEAs 238-1, 238-2, 238-*n* may be operatively coupled to the mouse controller 244 via a PEA driver 240-1, 240-2, 240-*n* that allows the mouse controller 244 to send signals to the PEAs 238-1, 238-2, 238-*n* as described herein. In an embodiment, a PEA 238-1, 238-2, 238-*n* may be placed below a TEG array 234-1, 234-2, 234-*n* such that the TEG array 234-1, 234-2, 234-*n* is placed between the PEA 238-1, 238-2, 238-*n* and the interior surface of the housing of the thermo-haptic mouse 216. In an embodiment, a pairing of a PEA 238-1, 238-2, 238-*n* and a TEG array 234-1, 234-2, 234-*n* may form a thermo-haptic module that provides both a change in temperature at a location on the thermo-haptic mouse 216 as well as a vibration at that location.

As may be appreciated, the number of TEG arrays 234-1, 234-2, 234-*n* and PEAs 238-1, 238-2, 238-*n* placed within the thermo-haptic mouse 216 may vary. In an embodiment, the number of TEG arrays 234-1, 234-2, 234-*n* may define a series of "zones" along the surface of the housing of the thermo-haptic mouse 216. Because each TEG array 234-1, 234-2, 234-*n* may be addressed individually by the mouse controller 244, each zone may define a distinct temperature zone that may either be heated or cooled by the TEG arrays 234-1, 234-2, 234-*n* individually. As such, as the gaming environment changes such as when an explosion occurs near the avatar and thermo-haptic feedback is to be provided at the thermo-haptic mouse 216, the user may feel, in this example, a wave of heat pass across the surface of the housing of the thermo-haptic mouse 216. The more zones created by the distribution of TEG arrays 234-1, 234-2, 234-*n* within the thermo-haptic mouse 216, the more granularity that wave may feel to the user. Similarly, the number of PEAs 238-1, 238-2, 238-*n* used may also allow for vibrations to be felt by the user in a wave motion across the surface of the housing.

In an embodiment, the thermo-haptic mouse 216 may include over voltage protection circuitry 248. The over voltage protection circuitry 248 may prevent any spikes in voltage from damaging the other components of the thermo-haptic mouse 216 during operation. The over voltage protection circuitry 248 may include, in an embodiment, any number of fuses, resistors or other circuit that prevents any spikes in voltage from reaching the other components of the thermo-haptic mouse 216.

The thermo-haptic mouse 216 may also include a low dropout regulator 250 in an embodiment. The low dropout regulator 250 may be used to regulate an output voltage to the mouse controller 244 and other components within the thermo-haptic mouse 216. The thermo-haptic mouse 216 may regulate the voltage provided to these other components even when the voltage supply is close in value to the output voltage.

The thermo-haptic mouse 216 may also include a motion sensor 252. During operation, the user may move the thermo-haptic mouse 216 in order to move a cursor or cause an avatar within the gaming environment to move. In an embodiment, the motion sensor 252 may include any device or devices that detect movement of the thermo-haptic mouse 216 in order to place the thermo-haptic mouse 216 in a "wake" state that activates an active translation detection device. In an embodiment, the motion sensor 252 is an accelerometer. In an embodiment, the motion sensor 252 may interact with an optical driver integrated circuit (IC) 254. The optical driver IC 254 may include a light emitting diode (LED) and a series of photodiodes. During operation, the motion sensor 252 may cause the optical driver IC 254 to be activated such that the photodiodes detect the light emitted from the LED. In this embodiment, the optical driver IC 254 may detect the movement of the thermo-haptic mouse 216 relative to the underlying surface. Although the present specification describes an optical driver IC 254 used to detect the movement of the thermo-haptic mouse 216, the present specification contemplates that other devices may be used such as a ball and roller system, a roller system, a LED detection system, and a gyroscopic system.

In an embodiment, input from the motion sensor 252 and optical driver IC 254 may be received at the mouse controller 244 along with other inputs from one or more buttons 258 formed at the thermo-haptic mouse 216. These buttons 258 may be used by a user to make selections on a graphical user interface (GUI) at the video/graphics display device 210. In specific embodiments, the buttons 258 may include a left-click button, a right-click button, and any other side buttons placed at a thumb location on the thermo-haptic mouse 216. In an embodiment, the thermo-haptic mouse 216 may also include a roller wheel to, in an embodiment, allow the user to scroll up and down a GUI.

The mouse controller 244 may be operatively coupled to an EEPROM 260 that may be used to, at least temporarily, store data such as signal data to be used by the mouse controller 244. The mouse controller 244 may access this EEPROM 260 in order to selectively activate the PEAs 238-1, 238-2, 238-*n* and TEG arrays 234-1, 234-2, 234-*n*. A clock 256 may also be used to synchronize the application of the feedback signals received by the mouse controller 244 from the processor of the information handling system 200.

Figure 3:
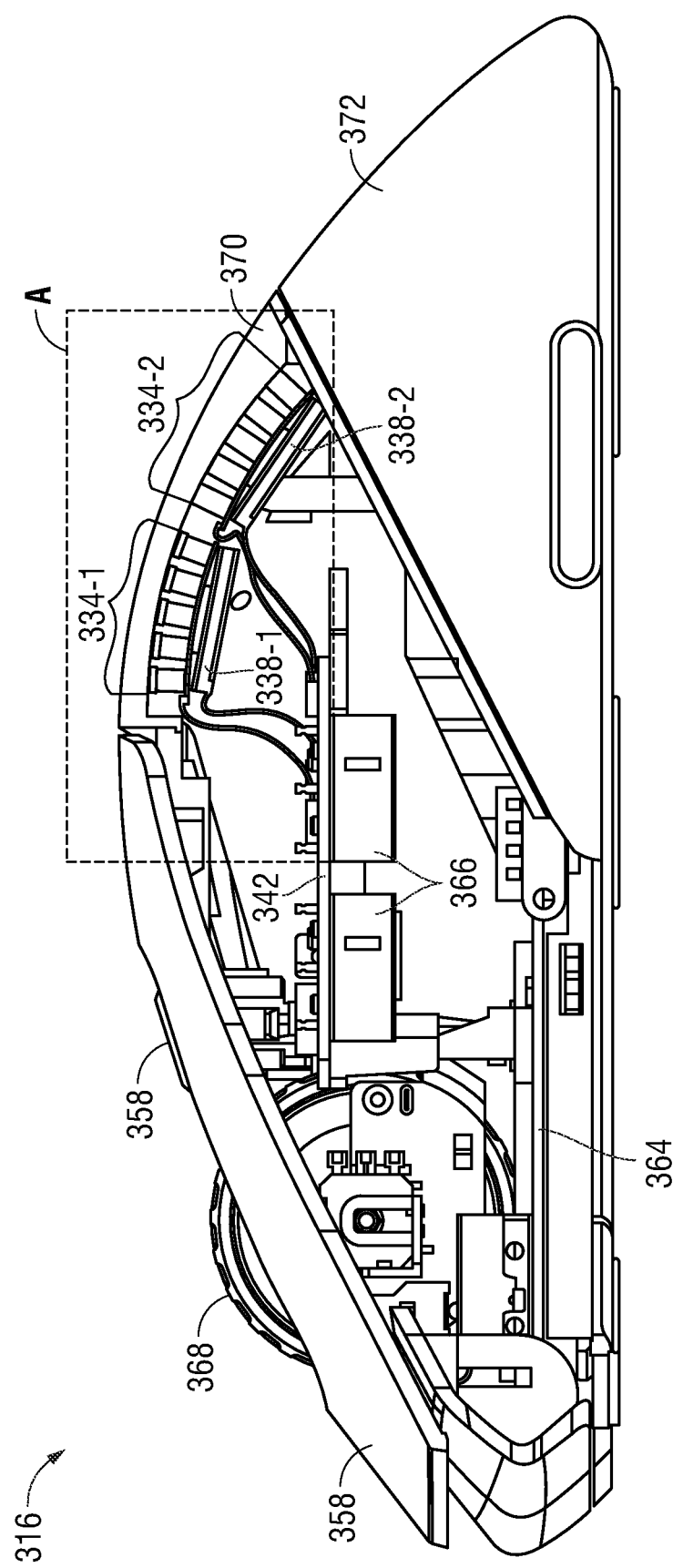
FIG. 3 is a side, partial cut-away view of a thermo-haptic mouse according to an embodiment of the present disclosure.

FIG. 3 is a side, partial cut-away view of a thermo-haptic mouse 316 according to an embodiment of the present disclosure. FIG. 3 shows only a portion of the housing 370, 372 of the thermo-haptic mouse 316 being removed to show the interior portions of the thermo-haptic mouse 316. The removed portions of the housing 370, 372 shown in FIG. 3 may include a portion of a mouse bottom and side housing 372 or a portion of a palm rest housing 370. Additionally, FIG. 3 include window "A" used to highlight a portion of the thermo-haptic mouse 316 represented in FIG. 4.

The thermo-haptic mouse 316 may be operatively coupled to an information handling system (not shown) by either a wired or wireless connection. Where the thermo-haptic mouse 316 is operatively coupled to an information handling system via a wired connection, the thermo-haptic mouse 316 may include a signal and power line operatively coupled to a roller/LED PCB 364. The wired connection to the roller/LED PCB 364 may provide the signal data from the processor of the information handling system as well as a voltage from, for example, a PMU at the information handling system. Where the thermo-haptic mouse 316 is operatively coupled to the information handling system via a wireless connection, the roller/LED PCB 364 may include a transceiver used to transmit and receive data to and from the information handling system. In this embodiment, the thermo-haptic mouse 316 may further include a stand-alone power source such as a battery (e.g., lithium ion rechargeable battery).

In the embodiment shown in FIG. 3, the thermo-haptic mouse 316 may include a first PCB such as the roller/LED PCB 364 and a second PCB such as PCB 342. The roller/LED PCB 364 may include circuitry used to receive input from one or more buttons 358 and a scrolling wheel 368 used by the user to provide input to the information handling system. Additional buttons may also be arranged for convenience to the user along the surface of the thermo-haptic mouse 316 such as one or more side buttons (not shown). Although FIG. 3 does not show a side button due to the portion of the housing 370, 372 being removed, FIG. 3 does show two side button actuators 366 that interface with the physical buttons placed on the side or thumb portion of the thermo-haptic mouse 316 (e.g., where the thermo-haptic mouse 316 is a right-handed mouse). Additional button actuators 366 are also present with each of the other buttons 358 but are not shown in FIG. 3 due to the housing 370, 372 of the thermo-haptic mouse 316 obstructing the view.

The roller/LED PCB 364 of the thermo-haptic mouse 316 may also include circuitry associated with a position- and movement-detection system. As described in connection with FIG. 2, the thermo-haptic mouse 316 may include a motion sensor that detects when the thermo-haptic mouse 316 is bumped or moved. This motion sensor may be used to "wake" the mouse so that power may be initiated at, for example, and optical driver also placed on the main roller/LED PCB 364. This may converse energy as well as reduce wear and tear on the components of the thermo-haptic mouse 316 when the thermo-haptic mouse 316 is not being used by still activated. The circuitry for both the motion sensor and optical driver (or other type of acceleration and position sensor such as a roller) may be placed on the roller/LED PCB 364.

The roller/LED PCB 364 may, in an embodiment, also house the mouse controller described herein and in connection with FIGS. 1 and 2 that is used to receive this input from the actuation of the buttons 358, their corresponding button actuators 366, scrolling wheel 368, the motion sensor, and the optical driver. This data received by the mouse controller may be processed into input data used by the information handling system to interact with a graphical user interface at the information handling system. In the context of the present specification, the input data provided by the mouse controller may be used to control an action within a gaming environment during execution of a gaming application. By way of example, the input data from the mouse controller to the processor of the information handling system may be interpreted by the processor to control a cursor on the video/graphics display device, control movement of an avatar within a gaming environment, or otherwise initiate a gaming action during game play.

The thermo-haptic mouse 316 may also include a dedicated PCB 342 that is operatively coupled to the roller/LED PCB 364 and the mouse controller in an embodiment. The dedicated PCB 342 may include circuitry associated with any TEG driver and PEA driver as well as connection ports used to operatively couple the first TEG array 334-1, the second TEG array 334-2, the first PEA 338-1, and the second PEA 338-2 in the embodiment in FIG. 3. Although FIG. 3 as well as the other figures herein, show the roller/LED PCB 364 and dedicated PCB 342 are two separate PCBs, the present specification contemplates that these two PCBs may be combined to reduce a footprint within the thermo-haptic mouse 316. In an embodiment, either of the roller/LED PCB 364 and dedicated PCB 342 may be divided into a further number of PCBs in order to better arrange of circuitry within the thermo-haptic mouse 316.

FIG. 3 also shows a specific arrangement of the first TEG array 334-1, second TEG array 334-2, first PEA 338-1, and second PEA 338-2 relative to each other. Although FIG. 3 shows only two TEG arrays and two PEAs, the present specification contemplates that any number of TEG arrays and PEAs may be placed within the housing of the thermo-haptic mouse 316 and against an inner surface of the housing 370, 372 of the thermo-haptic mouse 316. The location of the TEG arrays and PEAs may also vary. In an embodiment, one or more TEG arrays and/or PEAs may be placed underneath a button 358, along a side of the thermo-haptic mouse 316, or at any other location where a user may touch, even temporarily, the thermo-haptic mouse 316.

As described herein either of the first TEG array 334-1 and second TEG array 334-2 may include an array of p-doped and n-doped semiconductor pairs. The first TEG array 334-1 and second TEG array 334-2 shown in FIG. 3 may each be addressed by the mouse controller individually so that each of the first TEG array 334-1 and second TEG array 334-2 may be activated individually.

The p-doped and n-doped semiconductor pairs may be sandwiched between a top electric insulator and bottom electric insulator both made of, for example, a ceramic. The second TEG array 334-2 in FIG. 3 as well as the other figures are shown to not include these ceramic insulators for ease of illustration. However, it is intended that second TEG array 334-2 or any other TEG array placed within the thermo-haptic mouse 316 includes those ceramic electric insulators as that shown in the first TEG array 334-1 of FIG. 3.

The p-doped and n-doped semiconductor pairs, in the present specification, may each be considered a TEG in its own and each of the first TEG array 334-1 and second TEG array 334-2 may be referred herein as an array of TEG arrays. In an embodiment, each of the p-doped and n-doped semiconductor pairs as a single TEG may be addressed individually so that each of the TEGs may provide specific haptic feedback to the user in some embodiments. In a specific example, neighboring TEG arrays may be concurrently, sequentially, or otherwise activated to either heat or cool the housing 370, 372 of the thermo-haptic mouse 316. This selective activation of each of the TEG arrays may, to the perspective of the user, feel like a heat wave or cold wave has passed across the outer surface of the thermo-haptic mouse 316. In an embodiment, multiple TEG arrays may be used to define specific zones on the thermo-haptic mouse 316 and may be activated by the mouse controller in order to provide that haptic feedback. Again, the detected signals by the processor of the information handling system such as those shown in Table 1 may be used to provide specific TEG array behavior and this embodiment incorporates the use of those types of detected signals among others.

In an embodiment, the first TEG array 334-1 or second TEG array 334-2 may include a plurality of p-doped and n-doped semiconductor pairs that are activated together to heat or cool the housing 370, 372 of the thermo-haptic mouse 316. In an embodiment, the first TEG array 334-1 and second TEG array 334-2 may be independently activated at different times to provide a specific haptic feedback to the user. In an embodiment, in order to increase the number of zones that may independently heated or cooled, the number of TEG arrays 334-1, 334-2 placed across an interior surface of the housing 370, 372 may be increased. In this embodiment, the number of connectors to and from the TEG arrays 334-1, 334-2 may increase as the number of TEG arrays 334-1, 334-2 increases and the dedicated PCB 342 may incorporate these other connectors. In an embodiment, each of the TEG arrays 334-1, 334-2 may include a first lead operatively coupling the TEG arrays 334-1, 334-2 to the dedicated PCB 342 via a first connector. Additionally, in this embodiment, each of the TEG arrays 334-1, 334-2 may include a second lead operatively coupling the TEG arrays 334-1, 334-2 via another connector. The connectors in these embodiments may be operatively coupled to a TEG driver and the mouse controller as described herein. In these embodiments, the first lead and second lead may be used to provide a specific amount of voltage at a specific polarity across the TEGs within the TEG array in order to cause one of a heated or cooled effect at the first TEG array 334-1 and second TEG array 334-2.

As shown in FIG. 3, the thermo-haptic mouse 316 also includes a first PEA 338-1 and a second PEA 338-2. Again, the number of PEAs placed within the housing of the thermo-haptic mouse 316 may be more or less than two and the present specification contemplates these additional embodiments. Much like the TEG arrays 334-1, 334-2, the PEAs 338-1, 338-2 may be arranged so that they may impart a vibration click, or other mechanical effect on the housing 370, 372 of the thermo-haptic mouse 316 in order to provide another different kind of haptic feedback to the user. Again, the detected signals by the processor of the information handling system such as those shown in Table 1 may be used to provide specific PEA behavior and this embodiment incorporates the use of those types of detected signals among others in order to provide specific haptic feedback to the user.

In the embodiment shown in FIG. 3, a first PEA 338-1 has been placed behind the first TEG array 334-1 such that the first TEG array 334-1 is sandwiched between the first PEA 338-1 and an interior surface of the housing 370, 372 of the thermo-haptic mouse 316. In this arrangement the first PEA 338-1 can impart a vibration against the first TEG array 334-1 and the housing 370, 372 when activated. Activation of the first PEA 338-1 (and second PEA 338-2) may be accomplished when the mouse controller receives signals to activate the first PEA 338-1 and sends a voltage to piezoelectric material layer causing the piezoelectric material to expand. When the voltage is removed, the piezoelectric material shrinks back to its rest state. This expansion and contraction of the piezoelectric material upon selective application of the voltage creates a vibration click, or other mechanical effect that is felt by a user at a location on the surface of the housing 370, 372.

In an embodiment, a first PEA 338-1 and first TEG array 334-1 pair may be described herein as a thermo-haptic module. Multiple thermo-haptic modules (e.g., second TEG array 334-2 with a second PEA 338-2) may be arranged anywhere within the housing 370, 372 and along an interior wall of the housing 370, 372. Again, in order to increase the granularity of haptic feedback felt by the user, the number of thermo-haptic modules may be increased creating more zones along the surface of the housing 370, 372.

In an embodiment, the thermo-haptic module including a TEG array 334-1, 334-2 and a PEA 338-1, 338-2 may be arranged along an interior surface of the palm rest housing 370 where a user's palm is meant to rest. This may be one of many locations where these thermo-haptic modules may be placed and includes sufficient surface area to create multiple thermo-haptic feedback zones that can be detected by the user during operation of the thermo-haptic mouse 316. Additional locations may also include a button location and side locations where the thermo-haptic modules may be placed to impart the thermo-haptic feedback to a user.

Figure 4:
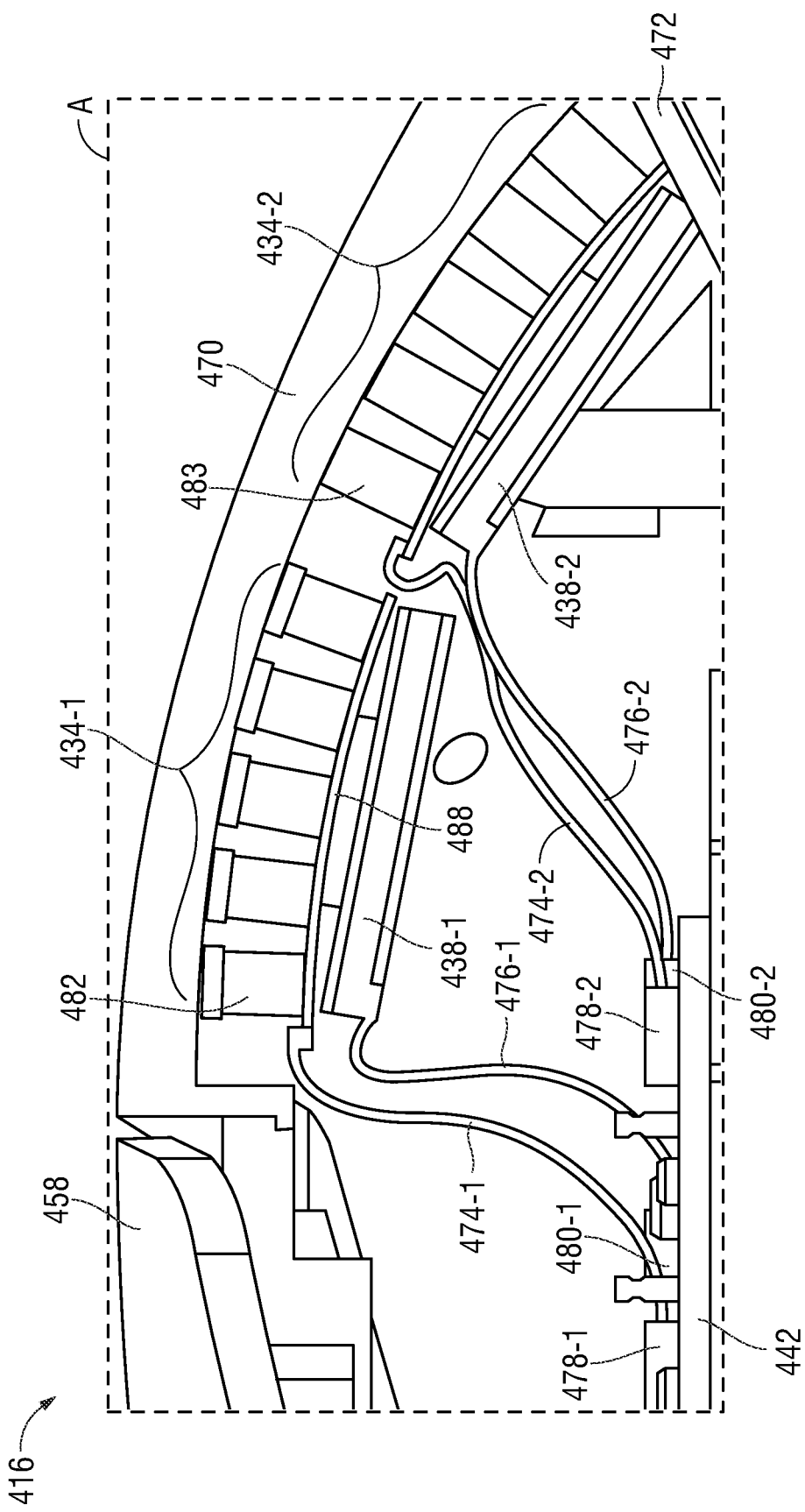
FIG. 4 is a side, cut-away view of a thermo-haptic mouse according to an embodiment of the present disclosure.

FIG. 4 is a side, partial cut-away view of a thermo-haptic mouse 416 according to an embodiment of the present disclosure. FIG. 4 specifically shows the window "A" in FIG. 3 in a closer view in order to view the details of the interface between the dedicated PCB 442 and the TEG arrays 434-1, 434-2 and PEAs 438-1, 438-2. Again, FIG. 4 shows a partial cut-away of the housings 470, 472 of the thermo-haptic mouse 416 in order to show the interior of the thermo-haptic mouse 416. The second TEG array 434-2 in FIG. 4 as well as the other figures are shown to not include these ceramic insulators for ease of illustration. However, it is intended that second TEG array 434-2 or any other TEG array placed within the thermo-haptic mouse 416 includes those ceramic electric insulators as that shown in the first TEG array 434-1 of FIG. 4.

The thermo-haptic mouse 416 includes a PCB 442 that has circuitry formed thereon to interface with the TEG arrays 434-1, 434-2 and PEAs 438-1, 438-2. In an embodiment, a first TEG array 434-1 may be operatively coupled to a first TEG controller/connector 478-1 via a first TEG first lead 474-1. The first TEG controller/connector 478-1 may include, for example, an application specific integrated circuit (ASIC) used to execute a TEG driver as described herein. In a specific embodiment, the first TEG controller/connector 478-1 (along with any other controller/connector described herein) may receive input from the mouse controller and may server as a processing or information handling system used to execute, for example, a driver application and cause the TEG array or PEA to be activated. In this embodiment, the first TEG controller/connector 478-1 may include an electrical connection such as a serial port to operatively couple the first TEG first lead 474-1 between the first TEG controller/connector 478-1 and first TEG array 434-1. In an embodiment, the first TEG controller/connector 478-1 may also include a second serial connection to operatively couple a first TEG second lead (not shown) between the first TEG controller/connector 478-1 and first TEG array 434-1. In an alternative embodiment, the TEG array 434-1 may include a single wire with a voltage applied to ground. In either example, a voltage is applied to the TEGs (e.g., the p-doped and n-doped semiconductor pairs 482, 483) in order to either heat or cool a top insulative layer (e.g., ceramic layer).

In an embodiment, a second TEG array 434-2 may be operatively coupled to a second TEG controller/connector 478-2 via a second TEG first lead 474-2. The second TEG controller/connector 478-2 may include, for example, an application specific integrated circuit (ASIC) used to execute a TEG driver as described herein. The second TEG controller/connector 478-2 may include an electrical connection such as a serial port to operatively couple the second TEG first lead 474-2 between the first TEG controller/connector 478-1 and second TEG array 434-2. In an embodiment, the second TEG controller/connector 478-2 may also include a second serial connection to operatively couple a second TEG second lead (not shown) between the second TEG controller/connector 478-2 and second TEG array 434-2.

In an embodiment, a first PEA 438-1 may be operatively coupled to a first PEA controller/connector 480-1 via a first PEA first lead 476-1. The first PEA controller/connector 480-1 may include, for example, an application specific integrated circuit (ASIC) used to execute a PEA driver as described herein. The first PEA controller/connector 480-1 may include an electrical connection such as a serial port to operatively couple the first PEA first lead 476-1 between the first PEA controller/connector 480-1 and first PEA 438-1. In an embodiment, the first PEA controller/connector 480-1 may also include a second serial connection to operatively couple a first PEA second lead (not shown) between the first PEA controller/connector 480-1 and first PEA 438-1.

In an embodiment, a second PEA 438-2 may be operatively coupled to a second PEA controller/connector 480-2 via a second PEA first lead 476-2. The second PEA controller/connector 480-2 may include, for example, an application specific integrated circuit (ASIC) used to execute a PEA driver as described herein. The second PEA controller/connector 480-2 may include an electrical connection such as a serial port to operatively couple the second PEA first lead 476-2 between the second PEA controller/connector 480-2 and second PEA 438-2. In an embodiment, the second PEA controller/connector 480-2 may also include a second serial connection to operatively couple a second PEA second lead (not shown) between the second PEA controller/connector 480-2 and second PEA 438-2.

Again, in an embodiment, a first PEA 438-1 and first TEG array 434-1 pair may be described herein as a thermo-haptic module. Multiple thermo-haptic modules (e.g., second TEG array 434-2 with a second PEA 438-2) may be arranged anywhere within the housing 470, 472 and along an interior wall of the housing 470, 472. Again, in order to increase the granularity of haptic feedback felt by the user, the number of thermo-haptic modules may be increased creating more zones along the surface of the housing 470, 472 in some embodiments.

In an embodiment, the thermo-haptic module including a TEG array 434-1, 434-2 and a PEA 438-1, 438-2 may be arranged along an interior surface of the palm rest housing 470 where a user's palm is meant to rest. This may be one of many locations where these thermo-haptic modules may be placed and includes sufficient surface area to create multiple thermo-haptic feedback zones that can be detected by the user during operation of the thermo-haptic mouse 416. Additional locations may also include a button location and side locations where the thermo-haptic modules may be placed to impart the thermo-haptic feedback to a user in various embodiments.

As described herein either of the first TEG array 434-1 and second TEG array 434-2 may include an array of p-doped and n-doped semiconductor pairs 482, 483. The p-doped and n-doped semiconductor pairs 482, 483 may be sandwiched between a top electric insulator and bottom electric insulator both made of, for example, a ceramic. The p-doped and n-doped semiconductor pairs 482, 483 in the present specification of the TEG arrays 434-1 and 434-2, may each be considered a single TEG in its own and each of the first TEG array 434-1 and second TEG array 434-2 may be referred herein as an array of TEGs 482, 483. In an embodiment, each of the TEGs 482, 483 may be addressed individually so that each of the TEGs 482, 483 may individually provide haptic feedback to the user in some embodiments. Additionally, or alternatively, the entire TEG arrays 434-1 and 434-2 may be addressed, in other embodiments. In a specific example, neighboring TEGs 482, 483 may be activated to either heat or cool the housing 470, 472 of the thermo-haptic mouse 416. This selective activation of each of the TEGs 482, 483 within the TEG array 434-1 and 434-2 may, to the perspective of the user, feel like a heat wave or cold wave has passed across the outer surface of the thermo-haptic mouse 416. Again, the detected signals by the processor of the information handling system such as those shown in Table 1 may be used to provide specific TEG array 434-1 and 434-2 behavior and this embodiment incorporates the use of those types of detected signals among others. As the number of individual TEGs 482, 483 is increased, a plural number of TEG first leads 474-1, 474-2 may be used to address the array of TEGs 482, 483 created. These leads may be formed into a serial lead line that allows each TEG 482 or 483 to operate as a single TEG or group of TEGs 482 or 483 to be addressed individually. In a specific embodiment, the plurality of serial leads may be arranged on a flexible substrate 488 to operatively couple the TEGs 482, 483 to the TEG drivers and connectors as described herein. In these embodiments, as the gaming environment changes when, for example, an explosion occurs near the avatar and thermo-haptic feedback is to be provided at the thermo-haptic mouse, the user may feel, in this example, a wave of heat pass across the surface of the housing of the thermo-haptic mouse. The more zones created by the distribution of TEGs within the thermo-haptic mouse, the more granularity that wave may feel to the user.

Figure 5:
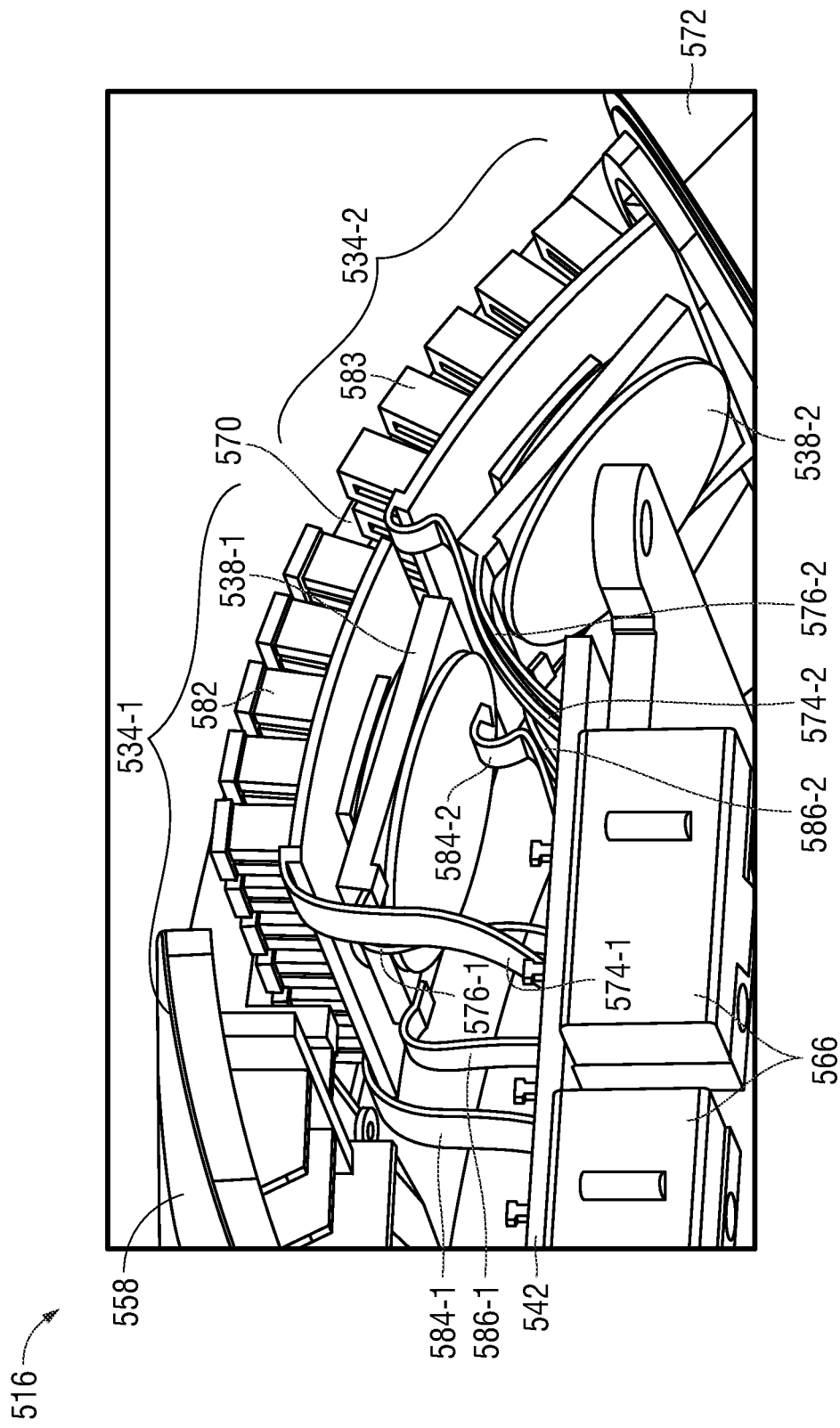
FIG. 5 is a perspective, cut-away view of a thermo-haptic mouse according to an embodiment of the present disclosure.

FIG. 5 is a perspective, cut-away view of a thermo-haptic mouse 516 according to an embodiment of the present disclosure. Again, FIG. 5 shows a partial cut-away of the housings 570, 572 of the thermo-haptic mouse 516 in order to show the interior of the thermo-haptic mouse 516. The second TEG array 534-2 in FIG. 5 as well as the other figures are shown to not include these ceramic insulators for ease of illustration. However, it is intended that second TEG array 534-2 or any other TEG array placed within the thermo-haptic mouse 516 includes those ceramic electric insulators as that shown in the first TEG array 534-1 of FIG. 5.

The thermo-haptic mouse 516 includes a PCB 542 that has circuitry formed thereon to interface with the TEG arrays 534-1, 534-2 and PEAs 538-1, 538-2. The circuitry may include interfaces with one or more button actuators 566 that receive input from a user pressing a button (not shown) formed on the housing 572 of the thermo-haptic mouse 516. The circuitry may also include, in an embodiment, a first TEG array 534-1 may be operatively coupled to a first TEG controller/connector 578-1 via a first TEG first lead 574-1. The first TEG controller/connector 578-1 may include, for example, an application specific integrated circuit (ASIC) used to execute a TEG driver as described herein. The first TEG controller/connector 578-1 may include an electrical connection such as a serial port to operatively couple the first TEG first lead 574-1 between the first TEG controller/connector 578-1 and first TEG array 534-1. In an embodiment, the first TEG controller/connector 578-1 may also include a second serial connection to operatively couple a first TEG second lead 584-1 between the first TEG controller/connector 578-1 and first TEG array 534-1.

In an embodiment, a second TEG array 534-2 may be operatively coupled to a second TEG controller/connector 578-2 via a second TEG first lead 574-2. The second TEG controller/connector 578-2 may include, for example, an application specific integrated circuit (ASIC) used to execute a TEG driver as described herein. The second TEG controller/connector 578-2 may include an electrical connection such as a serial port to operatively couple the second TEG first lead 574-2 between the first TEG controller/connector 578-1 and second TEG array 534-2. In an embodiment, the second TEG controller/connector 578-2 may also include a second serial connection to operatively couple a second TEG second lead 584-2 between the second TEG controller/connector 578-2 and second TEG array 534-2. In these embodiments, the first lead and second lead may be used to provide a specific amount of voltage at a specific polarity across the plurality of TEGs 582, 583 in order to cause one of a heated or cooled effect at the first TEG array 534-1 and second TEG array 534-2.

In an embodiment, a first PEA 538-1 may be operatively coupled to a first PEA controller/connector 580-1 via a first PEA first lead 576-1. The first PEA controller/connector 580-1 may include, for example, an application specific integrated circuit (ASIC) used to execute a PEA driver as described herein. The first PEA controller/connector 580-1 may include an electrical connection such as a serial port to operatively couple the first PEA first lead 576-1 between the first PEA controller/connector 580-1 and first PEA 538-1. In an embodiment, the first PEA controller/connector 580-1 may also include a second serial connection to operatively couple a first PEA second lead 586-1 between the first PEA controller/connector 580-1 and first PEA 538-1.

In an embodiment, a second PEA 538-2 may be operatively coupled to a second PEA controller/connector 580-2 via a second PEA first lead 576-2. The second PEA controller/connector 580-2 may include, for example, an application specific integrated circuit (ASIC) used to execute a PEA driver as described herein. The second PEA controller/connector 580-2 may include an electrical connection such as a serial port to operatively couple the second PEA first lead 576-2 between the second PEA controller/connector 580-2 and second PEA 538-2. In an embodiment, the second PEA controller/connector 580-2 may also include a second serial connection to operatively couple a second PEA second lead (not shown) between the second PEA controller/connector 580-2 and second PEA 538-2.

Again, in an embodiment, a first PEA 538-1 and first TEG array 534-1 pair may be described herein as a thermo-haptic module. Multiple thermo-haptic modules (e.g., second TEG array 534-2 with a second PEA 538-2) may be arranged anywhere within the housing 570, 572 and along an interior wall of the housing 570, 572. Again, in order to increase the granularity of haptic feedback felt by the user, the number of thermo-haptic modules may be increased creating more zones along the surface of the housing 570, 572.

In an embodiment, the thermo-haptic module including a TEG array 534-1, 534-2 and a PEA 538-1, 338-2 may be arranged along an interior surface of the palm rest housing 570 where a user's palm is meant to rest. This may be one of many locations where these modules may be placed and includes sufficient surface area to create multiple thermo-haptic feedback zones that can be detected by the user during operation of the thermo-haptic mouse 516. Additional locations may also include a button location and side locations where the thermo-haptic modules may be placed to impart the thermo-haptic feedback to a user.

As described herein either of the first TEG array 534-1 and second TEG array 534-2 may include an array of p-doped and n-doped semiconductor pairs 582 or 583 respectively. The p-doped and n-doped semiconductor pairs 582 or 583 may be sandwiched between a top electric insulator and bottom electric insulator both made of, for example, a ceramic. The p-doped and n-doped semiconductor pairs 582 or 583, in the present specification, may each be considered a single TEG 582, 583 in its own and each of the first TEG array 534-1 and second TEG array 534-2 may be referred herein as an array of TEGs 582 or 583, respectively. In an embodiment, each of the p-doped and n-doped semiconductor pairs 582 or 583 as a single TEG may be addressed individually so that each of the TEGs 582 or 583 may concurrently provide haptic feedback to the user. In a specific example, neighboring TEGs 582 or 583 may be activated to either heat or cool the housing 570, 572 of the thermo-haptic mouse 516. This selective activation of each of the TEGs 582 or 583 within the TEG array 534-1 and 534-2 may, to the perspective of the user, feel like a heat wave or cold wave has passed across the outer surface of the thermo-haptic mouse 516. Also, TEG arrays 534-1 and 534-2 may be selectively activated to define specific zones on the thermo-haptic mouse 316 and may be activated by the mouse controller in order to provide that haptic feedback. Again, the detected signals by the processor of the information handling system such as those shown in Table 1 may be used to provide specific TEG array 534-1 and 534-2 behavior and this embodiment incorporates the use of those types of detected signals among others. As the number of individual TEGs 582, 583 is increased, the number of TEG first leads 574-1, 574-2 may be used to address the TEGs arrays 534-1 and 534-2 created. These leads may be formed into a serial lead line that allows each p-doped and n-doped semiconductor pairs 582 or 583 as a single TEG or group of p-doped and n-doped semiconductor pairs 582 or 583 to be addressed individually. In a specific embodiment, the plurality of serial leads may be arranged on a flexible substrate 588 to operatively couple the TEGs 582, 583 to the TEG drivers and connectors as described herein.

Figure 6:
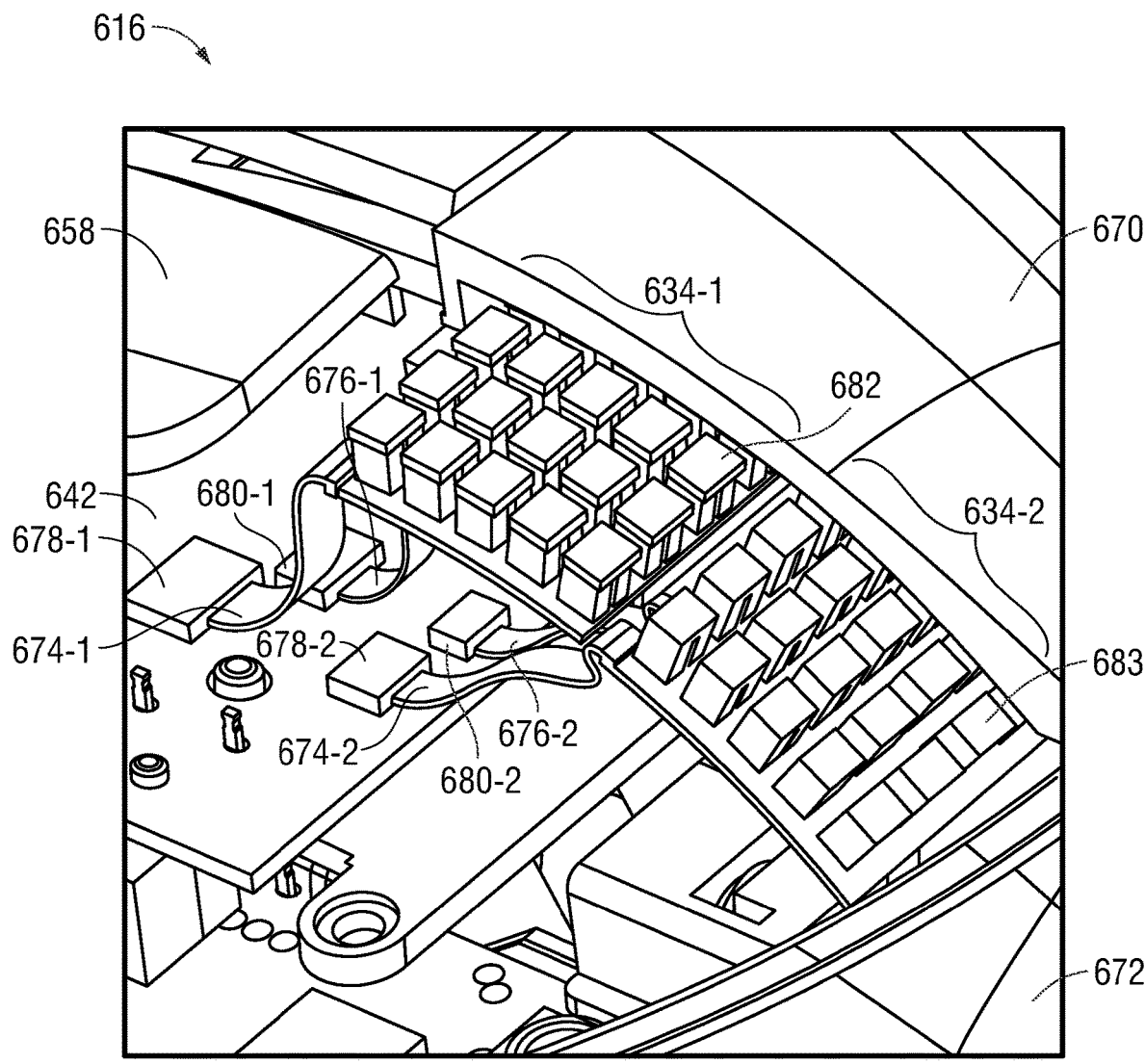
FIG. 6 is a perspective, cut-away view of a thermo-haptic mouse according to an embodiment of the present disclosure.

FIG. 6 is a perspective, cut-away view of a thermo-haptic mouse 616 according to an embodiment of the present disclosure. FIG. 6 shows a partial cutout of the housings 670, 672 of the thermo-haptic mouse 616 in order to show the interior of the thermo-haptic mouse 616. In this view shown in FIG. 6 a portion of the palm rest housing 670 has been removed to show a top view of the first TEG array 634-1 and second TEG array 634-2. Any PEAs have been blocked from view at this angle but a first PEA first lead 676-1 and a second PEA first lead 676-2 are shown in FIG. 6. The second TEG array 634-2 in FIG. 6 as well as the other figures are shown to not include these ceramic insulators for ease of illustration. However, it is intended that second TEG array 634-2 or any other TEG array placed within the thermo-haptic mouse 616 includes those ceramic electric insulators as that shown in the first TEG array 634-1 of FIG. 6.

The thermo-haptic mouse 616 includes a dedicated PCB 642 that has circuitry formed thereon to interface with the TEG arrays 634-1, 634-2 and PEAs 638-1, 638-2. The circuitry may include interfaces with one or more button actuators (not shown) that receive input from a user pressing a button (not shown) formed on the housing 672 of the thermo-haptic mouse 616. The circuitry may also include, in an embodiment, a first TEG array 634-1 may be operatively coupled to a first TEG controller/connector 678-1 via a first TEG first lead 674-1. The first TEG controller/connector 678-1 may include, for example, an application specific integrated circuit (ASIC) used to execute a TEG driver as described herein. The first TEG controller/connector 678-1 may include an electrical connection such as a serial port to operatively couple the first TEG first lead 674-1 between the first TEG controller/connector 678-1 and first TEG array 634-1. In an embodiment, the first TEG controller/connector 678-1 may also include a second serial connection to operatively couple a first TEG second lead (not shown) between the first TEG controller/connector 678-1 and first TEG array 634-1. During operation, the first TEG controller/connector 678-1 may operatively communicate with the mouse controller formed on a roller/light-emitting diode (LED) PCB similar to the roller/LED PCB described in connection with FIG. 3. The dedicated PCB 642 may, therefore, be operatively coupled to the roller/LED PCB using a dedicated connection so that data signals from the mouse controller describing how and when to activate any of the first TEG array 634-1, second TEG array 634-2, or any PEA may be received by their respective controllers 678-1, 678-2, 680-1, 680-2.

FIG. 6, similar to other figures herein, show that the first TEG controller/connector 678-1, second TEG controller/connector 678-2, first PEA controller/connector 680-1, and second PEA controller/connector 680-2 may include or be part of a connector formed on the PCB 642. However, the present specification contemplates that any controller used to operate the TEG arrays and PEAs may be formed separately from any connector. In an embodiment, the individual controllers 678-1, 678-2, 680-1, 680-2 may be formed on the roller/LED PCB and be operatively coupled to a connector on the dedicated PCB 642.

In an embodiment, a second TEG array 634-2 may be operatively coupled to a second TEG controller/connector 678-2 via a second TEG first lead 674-2. The second TEG controller/connector 678-2 may include, for example, an application specific integrated circuit (ASIC) used to execute a TEG driver as described herein. The second TEG controller/connector 678-2 may include an electrical connection such as a serial port to operatively couple the second TEG first lead 674-2 between the first TEG controller/connector 678-1 and second TEG array 634-2. In an embodiment, the second TEG controller/connector 678-2 may also include a second serial connection to operatively couple a second TEG second lead (not shown) between the second TEG controller/connector 678-2 and second TEG array 634-2.

In an embodiment, a first PEA (not shown) may be operatively coupled to a first PEA controller/connector 680-1 via a first PEA first lead 676-1. The first PEA controller/connector 680-1 may include, for example, an application specific integrated circuit (ASIC) used to execute a PEA driver as described herein. The first PEA controller/connector 680-1 may include an electrical connection such as a serial port to operatively couple the first PEA first lead 676-1 between the first PEA controller/connector 680-1 and first PEA 638-1. In an embodiment, the first PEA controller/connector 680-1 may also include a second serial connection to operatively couple a first PEA second lead (not shown) between the first PEA controller/connector 680-1 and first PEA 638-1.

In an embodiment, a second PEA 638-2 may be operatively coupled to a second PEA controller/connector 680-2 via a second PEA first lead 676-2. The second PEA controller/connector 680-2 may include, for example, an application specific integrated circuit (ASIC) used to execute a PEA driver as described herein. The second PEA controller/connector 680-2 may include an electrical connection such as a serial port to operatively couple the second PEA first lead 676-2 between the second PEA controller/connector 680-2 and second PEA 638-2. In an embodiment, the second PEA controller/connector 680-2 may also include a second serial connection to operatively couple a second PEA second lead (not shown) between the second PEA controller/connector 680-2 and second PEA 638-2.

Again, in an embodiment, a first PEA 638-1 and first TEG array 634-1 pair may be described herein as a thermo-haptic module. Multiple thermo-haptic modules (e.g., second TEG array 634-2 with a second PEA 638-2) may be arranged anywhere within the housing 670, 672 and along an interior wall of the housing 670, 672. Again, in order to increase the granularity of haptic feedback felt by the user, the number of thermo-haptic modules may be increased creating more zones along the surface of the housing 670, 672.

In an embodiment, the thermo-haptic module including a TEG array 634-1, 634-2 and a PEA 638-1, 338-2 may be arranged along an interior surface of the palm rest housing 670 where a user's palm is meant to rest. This may be one of many locations where these thermo-haptic modules may be placed and includes sufficient surface area to create multiple thermo-haptic feedback zones that can be detected by the user during operation of the thermo-haptic mouse 616. Additional locations may also include a button location and side locations where the thermo-haptic modules may be placed to impart the thermo-haptic feedback to a user.

As described herein either of the first TEG array 634-1 and second TEG array 634-2 may include an array of p-doped and n-doped semiconductor pairs 682 or 683. The p-doped and n-doped semiconductor pairs 682 or 683 may be sandwiched between a top electric insulator and bottom electric insulator both made of, for example, a ceramic. The p-doped and n-doped semiconductor pairs 682 or 683, in the present specification, may each be considered a single operating TEG in its own and each of the first TEG array 634-1 and second TEG array 634-2 may be referred herein as an array of TEGs 682 or 683. In an embodiment, each of the p-doped and n-doped semiconductor pairs 682 or 683 as a single TEG may be addressed individually so that each of the TEGs 682 or 683 may concurrently provide haptic feedback to the user. In a specific example, neighboring TEGs 682 and 683 may be concurrently activated to either heat or cool the housing 670, 672 of the thermo-haptic mouse 616. This selective activation of each of the TEGs 682 or 683 within the TEG array may, to the perspective of the user, feel like a heat wave or cold wave has passed across the outer surface of the thermo-haptic mouse 616. Again, the detected signals by the processor of the information handling system such as those shown in Table 1 may be used to provide specific TEG 682 or 683 behavior or groups of TEGs 682 or 683 within TEG arrays 634-1 and 634-2 and this embodiment incorporates the use of those types of detected signals among others. As the number of individual p-doped and n-doped semiconductor pairs 682 as a single TEG 682 or 683 is increased, the number of TEG first leads 674-1, 674-2 may be used to address the individual TEG stacks 682 or 683, groups of TEG stacks 682 or 683, or TEG arrays 634-1 and 634-2 created. These leads may be formed into a serial lead line that allows each p-doped and n-doped semiconductor pair 682 or 683 as a single TEG or group of p-doped and n-doped semiconductor pairs 682 or 683 to be addressed individually. In a specific embodiment, the plurality of serial leads may be arranged on a flexible substrate 688 to operatively couple the TEG arrays 634-1 and 634-2 to the TEG drivers and connectors as described herein. In other embodiments, each TEG array 634-1, 634-2 may be addressed as a group of TEGs 682 or 683 as well as described herein.

Figure 7:
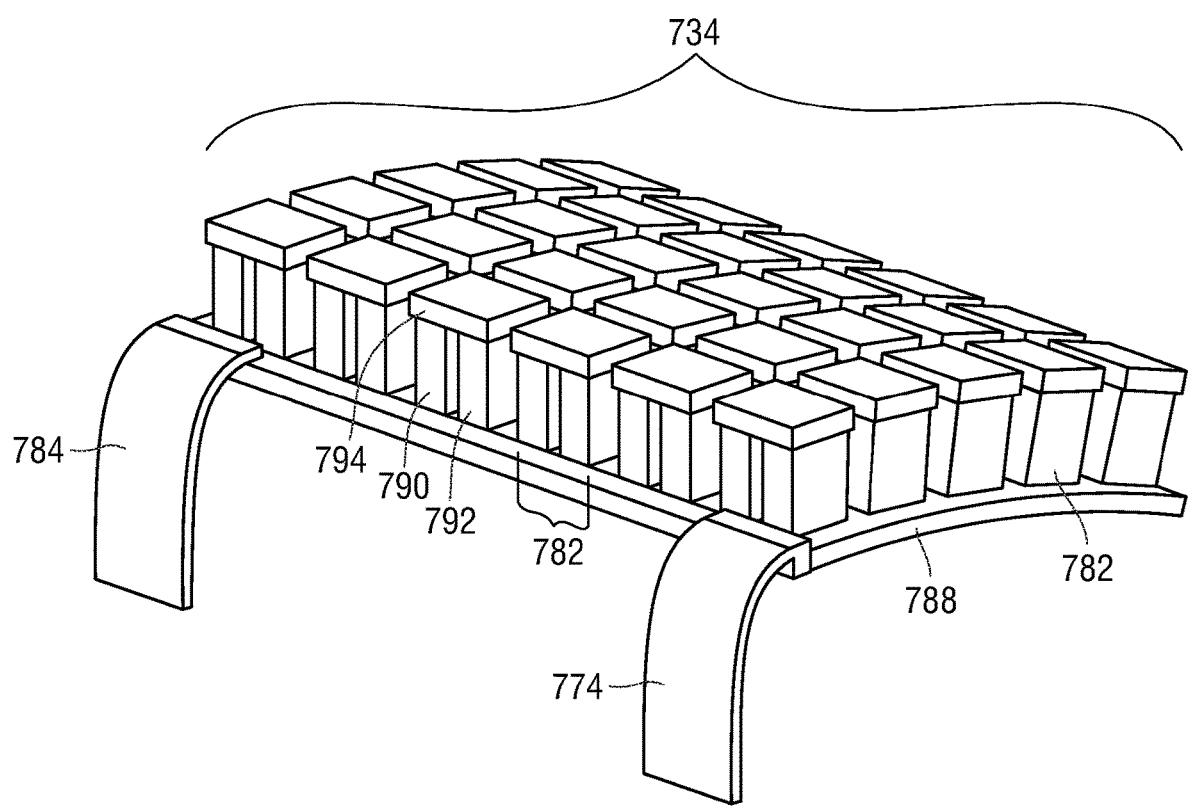
FIG. 7 is a perspective view of a thermoelectric generator according to an embodiment of the present disclosure.

FIG. 7 is a perspective view of a TEG array 734 according to an embodiment of the present disclosure. The TEG array 734 may include a plurality of p-doped 790 and n-doped semiconductor 792 pairs 782 with a top electric insulator layer 794 formed between the p-doped and n-doped semiconductor pairs 782. In an embodiment, the p-doped 790 and n-doped semiconductor 792 pairs 782 may be connected in series using a flexible substrate 788 as a surface to operatively coupled the p-doped 790 and n-doped semiconductor 792 pairs 782 using electrical traces formed thereon. In this embodiment, the TEG array 734 may receive a voltage across a TEG first lead 774 to a TEG second lead 784 in order to selectively heat and cool a portion of the housing with the TEG array 734 of the thermo-haptic mouse described herein.

In an alternative embodiment, the TEG array 734 shown in FIG. 7 may include multiple addressable TEGs 782 formed out of each of the p-doped 790 and n-doped semiconductor 792 pairs 682. In this embodiment, the TEG first lead 774 and TEG second lead 784 may include a plurality of wires that address a single or a group of p-doped and n-doped semiconductor pairs 782, individually, such that the TEG array 734 shown here becomes an array of individually activatable TEG pairs 782. The p-doped semiconductor 790 and n-doped semiconductor 792 may each include charge carriers that allow electrons to pass from one semiconductor to another. In the doped n-type semiconductors 792, the charge carriers are electrons while in doped p-type semiconductors 790, the charge carriers are holes. The diffusion of the charge carriers away from one side may create a hot side at the other side of the semiconductor. This buildup of charge carriers at one end created by a voltage potential is directly proportional to the temperature difference created across the semiconductor.

For example, the TEG array 734 shown in FIG. 7 may have a first TEG first lead 774 that addresses and selectively activates one or a subset of p-doped 790 and n-doped 792 semiconductor pairs 782 among the p-doped and n-doped semiconductor pairs 782 formed on the flexible substrate 788. In an embodiment, the flexible substrate may be made of a polyimide.

In this embodiment, an additional TEG first lead 774 may also be added to address and selectively activate one or a subset of p-doped 790 and n-doped semiconductor 792 pairs 782 among the p-doped 790 and n-doped semiconductor 792 pairs 782 formed on the flexible substrate 788. In this way, a first group of p-doped 790 and n-doped semiconductor 792 pairs 782 may be activated to, for example, heat, a portion of the housing of the thermo-haptic mouse while a second group of p-doped 790 and n-doped semiconductor 792 (e.g., TEG pairs 782) on the TEG array 734 may be activated to selectively heat or cool that housing at a different location along the surface of the housing.

The TEG array 734 may also include a TEG second lead 784 that allows a circuit to be formed between the TEG array 734 and the TEG driver and mouse controller described herein. Again, where the number of TEG first leads 774 is increased to addressed specific p-doped 790 and n-doped semiconductor 792 pairs 782, the number of TEG second leads 784 is also increased to form those individual circuits to enable more granular addressing of TEG pairs 782 of the TEG array 734.

Figure 8:
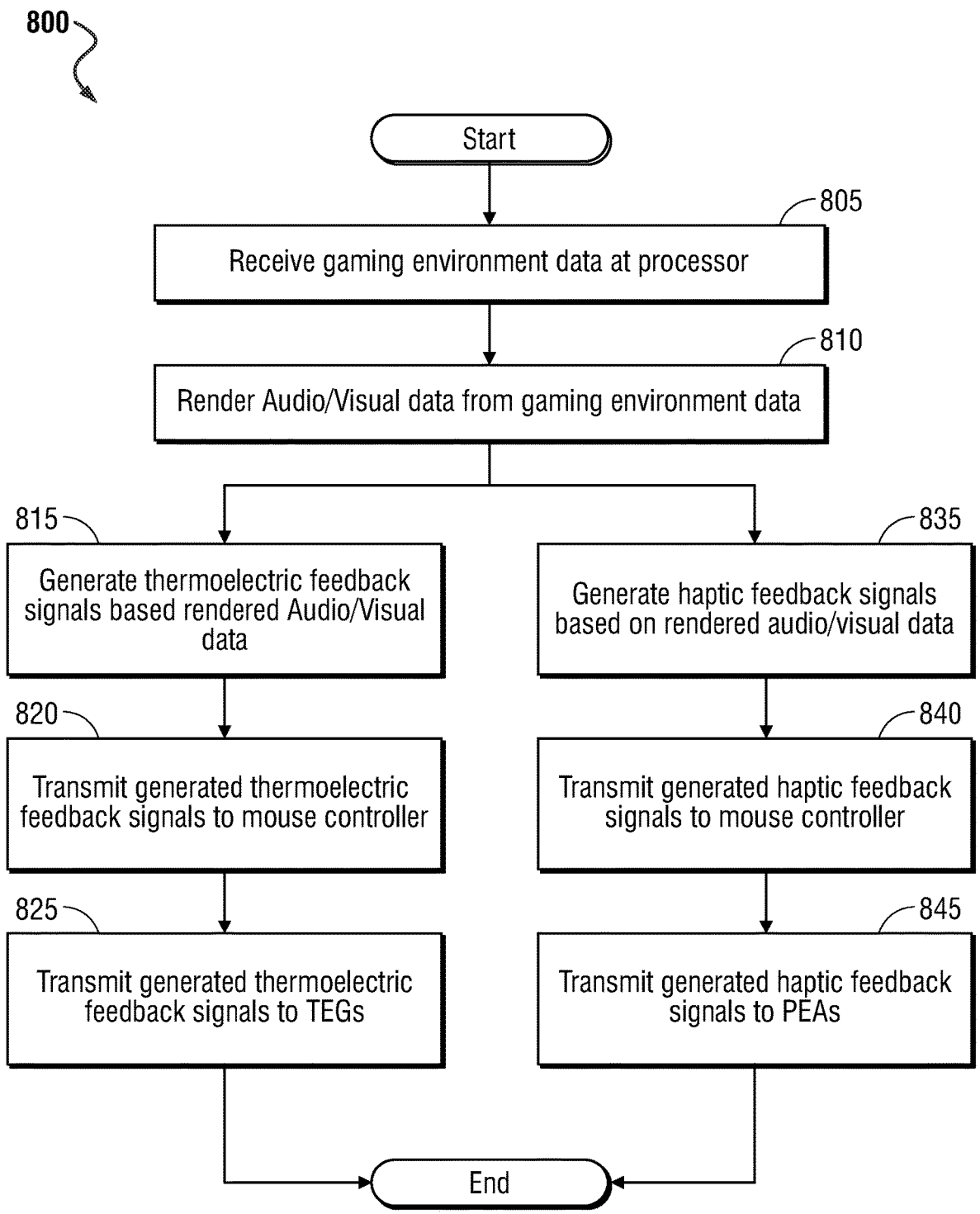
FIG. 8 is a flow diagram illustrating a method of activating a thermo-haptic mouse according to an embodiment of the present disclosure.

FIG. 8 is a flow diagram illustrating a method 800 of activating a thermo-haptic mouse according to an embodiment of the present disclosure. As described herein, the thermo-haptic mouse may be used for both input to an information handling system as well as output to the user in the form of thermo-haptic feedback. This output to the user may be provided based on events and objects within a gaming environment. For example, where the gaming application being executed on the information handling system is a first-person shooter gaming application, certain explosions, gun shots, and interactions with objects within the gaming environment may be output as vibrations, heat, or cooling at the thermo-haptic mouse.

The method 800 may begin with a processor receiving gaming action event environment data at block 805. This gaming action event environment data may be data describing images captured of different game environment features at different angles. These images may include action that has or will take place during execution of the gaming application by the processor during game play. These captured images may include images of objects, actions, or other environmental characteristics that is to be interpreted by the processor as creating thermo-haptic output to the thermo-haptic mouse. Examples of these objects, actions, or other environmental characteristics are represented in Table 1 herein. In the context of, for example, the first-person shooter gaming application, a gunshot may produce both acoustic and visual data that is to be interpreted by the processor as also associated with one or more of a mechanical vibrational or thermo feedback to the user at the thermo-haptic mouse. How and when to interpret these objects, actions, or other environmental characteristics as eliciting thermo-haptic feedback to the user at the thermo-haptic mouse may be determined by training a haptic mouse feedback machine learning system and providing, as input, these gaming environment data descriptive of the objects, actions, or other environmental characteristics in order to get specific output describing to the processor what feedback is to be provided to the user at the thermo-haptic mouse. The training of the haptic mouse feedback machine learning system and provision of output from the haptic mouse feedback machine learning system is described herein in more detail. In other embodiments, the gaming application may be programmed to elicit thermo-haptic feedback during various gaming action events such as the action events shown in Table 1 for example.

At block 810, the method 800 may continue with rendering audio/visual data from the gaming environment. As briefly mentioned, this may be done by capturing images of current game play or images from a database describing that game play and determining what objects, actions, or other environmental characteristics should elicit thermo-haptic feedback at the thermo-haptic mouse. In an alternative embodiment, the gaming application may provide thermo-haptic feedback identifications at various action points during game play.

The method 800 may continue at blocks 815 and 835 with generating thermoelectric feedback signals and generating haptic feedback signals based on the rendered audio and visual data, respectively. In this embodiment, the audio and visual data may indicate that the TEG arrays and PEAs should be activated. Again, an example set of parameters regarding if and when the TEG arrays and PEAs should be activated is presented in Table 1. For example, when a first-person shooter gaming application is being executed by the processor, a gun may be used and shot. This specific type of action may create audio and visual output in the form of an audio spike and a bright flash, respectively. In this embodiment, both of the audio spike and bright flash may generate haptic (bump, click, vibration) and thermoelectric (heat or cooling) signals at blocks 835 and 815, respectively.

The method 800 may continue with transmitting the generated thermoelectric feedback signals and haptic feedback signals to the mouse controller at blocks 820 and 840, respectively. Because the TEG arrays and PEAs may be activated individually, the mouse controller may receive either or both of these two types of signals in order to activate the TEG arrays and PEAs independent of each other. In the example where the first-person shooter gaming application includes the avatar shooting a gun, the thermoelectric feedback may be delayed relative to the haptic (bump, click, or vibration) feedback due to the heat arriving at the avatar later than mechanical response of the gun and an audio wave arriving at the avatar. This would further elicit a more realistic feedback scenario at the thermo-haptic mouse.

At blocks 825 and 845, the generated thermoelectric feedback signals and the generated haptic feedback signals may be passed to the TEG arrays and the PEAs, respectively. Again, the timing of the relay of these signals, the duration of time the TEG arrays and PEAs are activated, and the pattern of activation of the TEG arrays and PEAs may be individually addressed by the mouse controller based on the type of feedback isolated in the haptic signal for the gaming action event. At this point, the method 800 may end. It is appreciated that the method described in connection with FIG. 8 may be repeated any number of times as long as a gaming application is being executed by the processor of the information handling system or when thermo-haptic feedback including mechanical haptic feedback or thermo-electric feedback is to be presented to the user at the thermo-haptic mouse.

Figure 9:
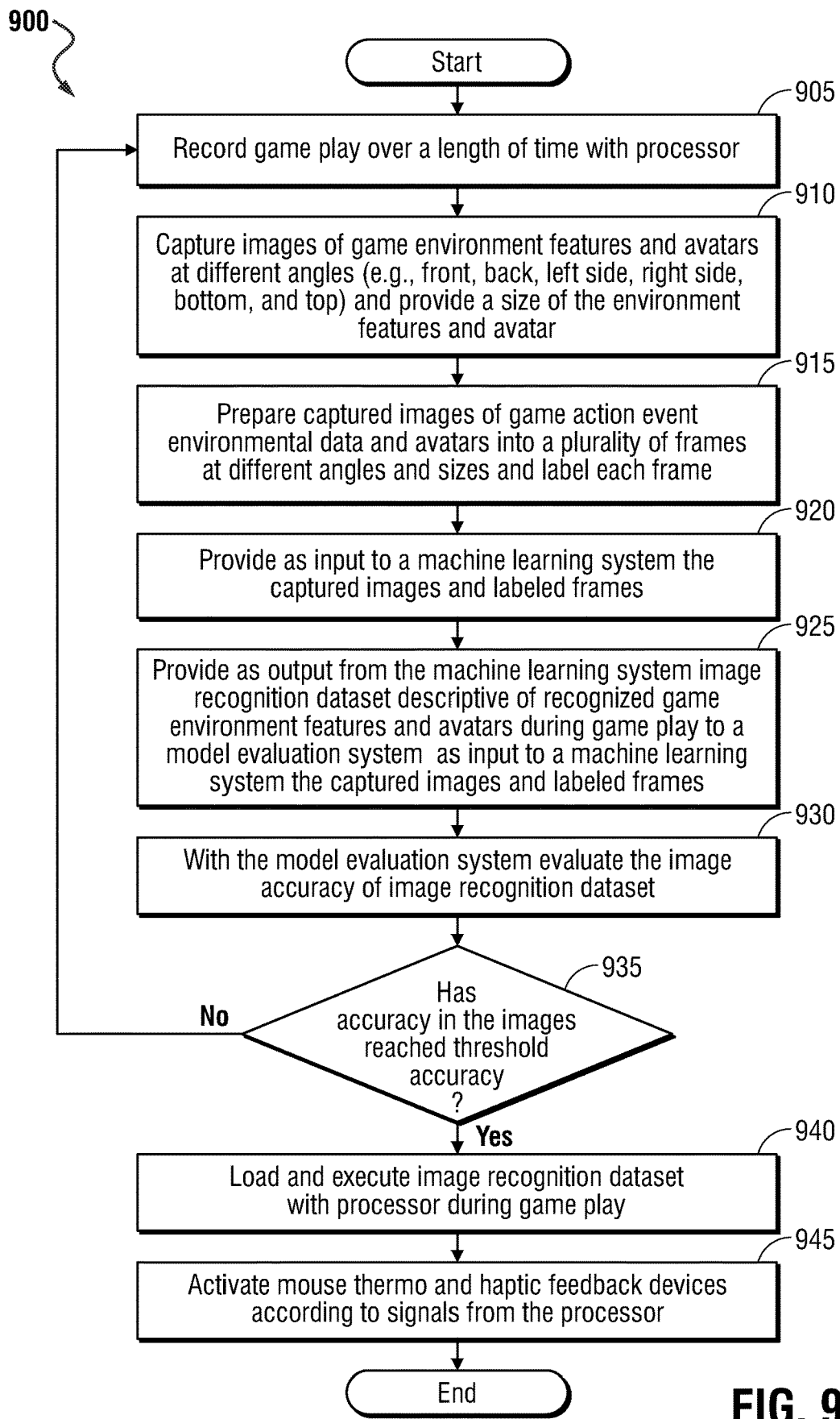
FIG. 9 is a flow diagram illustrating a method of training a machine learning system to control the activation of a thermo-haptic mouse according to an embodiment of the present disclosure.

FIG. 9 is a flow diagram illustrating a method 900 of training a machine learning system to control the activation of a thermo-haptic mouse according to an embodiment of the present disclosure. The method of FIG. 9 may be used when thermo-haptic feedback instructions are not part of the gaming application code instructions for example. The method 900 may begin at block 905 with recording game play over a length of time using the processor of the information handling system. During operation the information handling system may execute computer code associated with a gaming application. This gaming application may be any type of gaming application that presents to a user, as visual output, a gaming environment. This environment may include any number of objects, actions, or other environmental characteristics as well as, in an embodiment, an avatar. The recorded game play may be descriptive of these objects, actions, or other environmental characteristics seen or to be seen by a user. In an embodiment, this recording of game play may occur while a user is engaged with actual game play. Additionally, or alternatively, the recording of game play may have already occurred as demonstrative training data and stored on a database accessible by the processor of the information handling system.

The method 900 may also include capturing images of game environment features and avatars at different angles (e.g., front, back, left side, right side, bottom, and top) and providing a size of the environment features and avatar at block 910. The images may be a series of still frame images that depict certain objects, actions, or other environmental characteristics that may affect whether the processor does or does not provide thermo-haptic feedback to the thermo-haptic mouse.

At block 915, the method 900 may include preparing those captured images of the game action event environmental data and avatars into a plurality of frames at different angles and sizes and label each frame. Again, the in the example where the gaming application is a first-person shooter gaming application, the captured images may be of a hand touching snow, an explosion, immersion into water, a gunshot, or getting shot by another avatar, among other objects, actions, or other environmental characteristics. These captured images may then be prepared and placed into at a plurality of frames at different angles and sizes with each frame being labeled for further analysis.

This analysis of the frames created at block 915 may be used as input into a haptic mouse feedback machine learning system. At block 920, the captured images at block 910 and the frames prepared at block 915 may be provided as input to the haptic mouse feedback machine learning system. Because the haptic mouse feedback machine learning system may be trained prior to use, the captured images at block 910 and the frames prepared at block 915 may server to first train the haptic mouse feedback machine learning system. Later captured images at block 910 and the frames prepared at block 915 may be used as actual input to an inference model of trained machine learning to receive an intended type of output.

The haptic mouse feedback machine learning system, in an embodiment may, upon execution by the processor, determine such correlations between the captured images at block 910 and the frames prepared at block 915 and haptic feedback to be initiated at the thermo-haptic mouse, in an embodiment, based on any machine learning or neural network methodology known in the art or developed in the future. In a specific embodiment, the haptic mouse feedback machine learning system may implement an unsupervised learning or supervised learning technique. For example, the haptic mouse feedback machine learning system in an embodiment may model the relationships between each captured image and action within the gaming environment such as those described in Table 1. The haptic mouse feedback machine learning system may do this using, for example, a layered neural network topology. Such a neural network in an embodiment may include an input layer including a known, recorded set of values for each of these parameters, settings, indicators, and image data metrics, and an output layer including an image recognition dataset descriptive of recognized game action event environmental data during execution of the gaming application, based on the known, captured images in the input layer at block 930. The haptic mouse feedback machine learning system in an embodiment may propagate input through the layers of the neural network to project or predict the image recognition datasets based on the known and recorded images at block 925. Using a back-propagation method, the haptic mouse feedback machine learning system, in an embodiment, may then use the captured images to adjust weight matrices of the neural network describing the ways in which image data metrics are likely to affect the image recognition datasets in an embodiment.

At block 925, the processor may provide as output from the machine learning system image recognition dataset descriptive of recognized game environment features and avatars during game play to a model evaluation system. As the number of captured images at block 910 and the prepared frames at block 915 increases for input into the machine learning system, the output may become more refined and capable of recognizing those objects, events, actions, or other environmental characteristics that would provide thermo-haptic feedback to the user at the thermo-haptic mouse.

At block 930, the method 900 includes a thermo-haptic feedback model evaluation system evaluating the accuracy of this image recognition dataset. The thermo-haptic feedback model evaluation system may be computer code executed by the processor of the information handling system. The image recognition dataset inference model produced after the training of the haptic mouse feedback machine learning system will be used by the processor of the information handling system to provide thermo-haptic signals to an array of and one or more to provide thermo-haptic feedback commensurate with the game action environment during game play. In order to do so, the thermo-haptic feedback model evaluation system evaluates the accuracy of the image recognition dataset so that an appropriate level and type of thermo-haptic feedback is provided to the TEG arrays and PEAs of the thermo-haptic mouse.

At block 935, the model evaluation system determines if the accuracy of the image dataset has reached a threshold accuracy. Where, at block 935, the accuracy of the image dataset has not reached a threshold accuracy the method 900 may continue back at block 905 with recording more game play and using any data generated therefrom to further train the haptic mouse feedback machine learning system. This may indicate that an insufficient number of captured images at block 910 and the prepared frames at block 915 were not provided to the machine learning system at block 920. Where, at block 935, the accuracy of the image dataset has reached a threshold accuracy the method 900 may continue at block 940.

At block 940, the method 900 may continue with loading and executing the image recognition dataset with the processor during game play. This image recognition dataset may inform the processor when any objects, actions, or other environmental characteristics indicate that the TEG arrays or PEAs at the thermo-haptic mouse are to be activated. Using the trained inference model of the machine learning system, this image recognition dataset produced after the training of the haptic mouse feedback machine learning system may be used by the processor of the information handling system executing to provide thermo-haptic signals to an array of and one or more to provide thermo-haptic feedback commensurate with the game action environment during game play. Thus, the processor may determine when, during gameplay, these objects, actions, or other environmental characteristics have occurred and relay signals to the thermo-haptic mouse for activation of the TEG arrays and PEAs.

At block 945, the signals produced by the processor at block 940 may be used to activate the thermo-haptic feedback devices in the thermo-haptic mouse such as the TEG arrays and PEAs. This activation may be further controlled by a mouse controller on the thermo-haptic mouse as described herein. Each of the types of haptic feedback (e.g., heating, cooling, and vibration) may be accomplished according to the type of objects, actions, or other environmental characteristics experienced or engaged with by the user according to Table 1 above for example. Again, although Table 1 describes the activation of the TEG arrays and PEAs during execution of a first-person shooter gaming application, the principles described herein are equally applicable to other types and genres of gaming applications that may be executed by the processor of the information handling system. The present specification contemplates these other use-cases and further contemplates that other types of object interactions, actions, or other environmental characteristics may be present to elicit other types of activations of the TEG arrays and PEAs at the thermo-haptic mouse.

Figure 10:
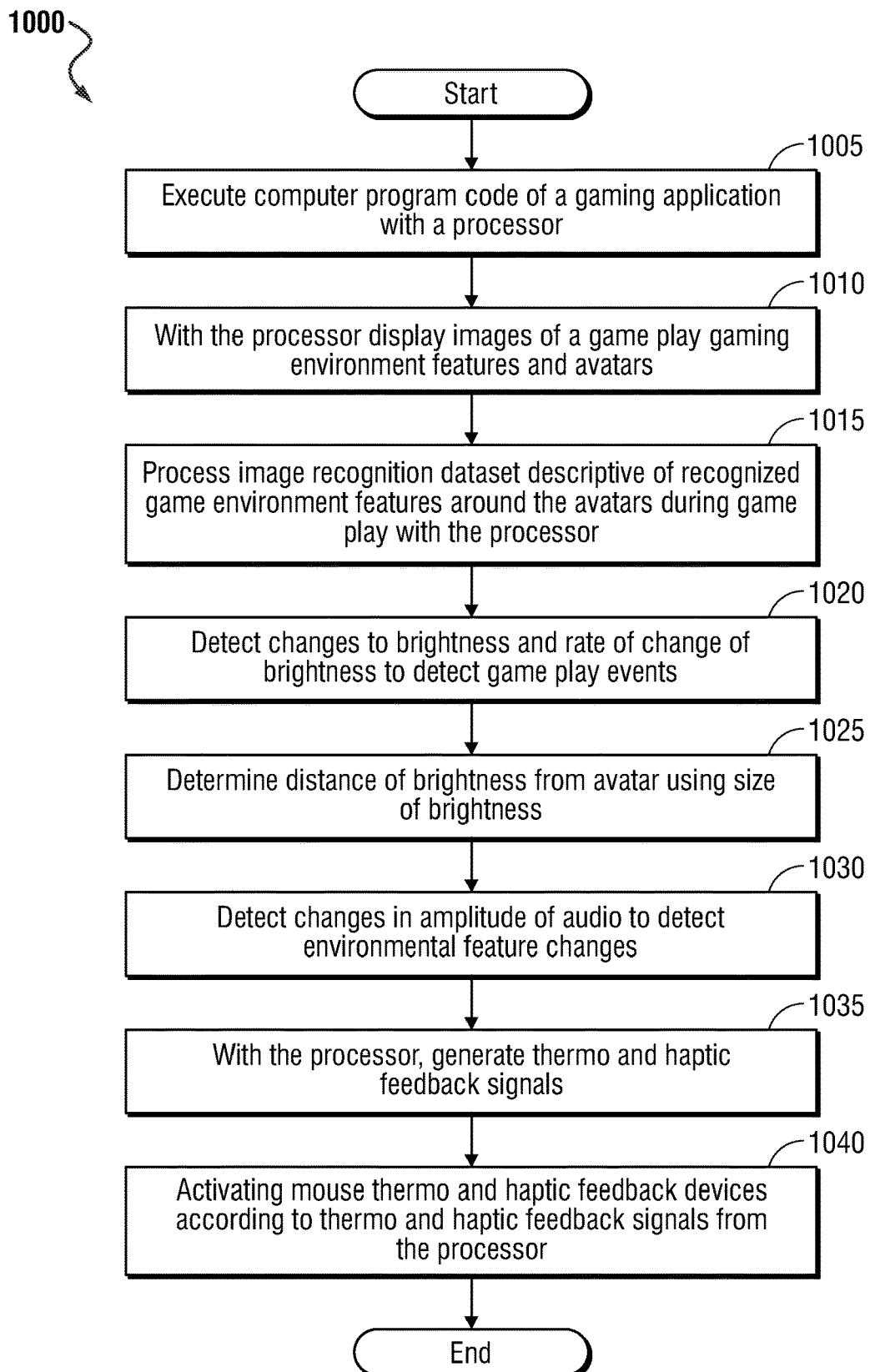
FIG. 10 is a flow diagram illustrating a method of tracking action on a screen during game play to control the activation of one or more TEG arrays and PEAs of a thermo-haptic mouse according to an embodiment of the present disclosure.

FIG. 10 is a flow diagram illustrating a method 1000 of tracking action on a screen during game play to control the activation of one or more TEG arrays and PEAs of a thermo-haptic mouse according to an embodiment of the present disclosure. The method 1000 may begin at block of 1005 with executing computer program code descriptive of a gaming application with a processor. The gaming application may be any type and genre of game that a user may interact with by receiving output from, for example, a video graphics display and providing input via a keyboard and the thermo-haptic mouse described herein. Continuing with the example provided herein, the gaming application may be a first-person shooter gaming application.

The method 1000 may continue at block 1010 with displaying images of game play gaming environment features and, in an embodiment, avatars. As described herein, the user may interact with the video graphics display and may be presented with images of a gaming environment. In the context of the first-person shooter gaming application, the user may see various objects and actions that exist and occur within the gaming application. In an embodiment, the avatar may be a full-body view of the avatar or a partial view of the avatar. In accordance with the principles described herein, the actions that may be presented in this gaming environment may include explosions, gun shots, the avatar being shot, immersion into water, touching of snow by the avatar, among others. Each of these objects, actions, or other environmental characteristics, as well as others, may be represented as thermo-haptic feedback at the thermo-haptic mouse to the user according to the principles described herein.

The method 1000 may, at block 1015, continue with processing image recognition datasets descriptive of recognized game environment features around the avatars during game play with the processor. As described herein in connection with FIG. 9, the image recognition dataset may be generated through the training and use of a haptic mouse feedback machine learning system. The process of training and providing input to the haptic mouse feedback machine learning system in order to receive output in the form of image recognition dataset will not be described again here.

With the image recognition dataset, the processor may detect changes to brightness and rate of change of brightness to detect game play events at block 1020 in the method 1000. The detection of the changes in brightness may be detected using any type of computer implemented object recognition process, any color and object identification process, and/or any image detection process that may recognize changes or spikes in brightness within one or more frames of the gaming environment. For example, in the first-person shooter gaming application, an explosion may be represented with a bright and large flash of white, yellow, red, and/or orange colors. In this example, the processor may detect these colors or images and determine that an explosion has occurred. A rate of change among a plurality of frames of the image recognition dataset may also be considered in order to determine, for example, a rate of change of the images to, for example, determine the velocity of the explosion as well as the size of the explosion. These additional measurements may be used to further determine how the TEG arrays and PEAs within the thermo-haptic mouse are to be activated by the mouse controller and processor of the information handling system.

The method 1000 may also include determining the distance of the brightness from the avatar using the size measurement at block 1025. The processor, in this embodiment, may also use any calculation such as the Pythagorean theorem to determine perspectives of these relative sizes and distances. In an embodiment, the processor may also determine a directionality of the brightness (e.g., towards avatar or away from avatar).

Along with the brightness and size of the event (e.g., the explosion) being determined by the processor, the method 1000 may further include detecting changes in an amplitude of the audio to detect additional environmental feature changes at block 1030. In this embodiment, the audio output from the execution of the gaming application may cause noises at certain volumes to be provided to the user via, for example, speakers of the information handling system. This audio data may include various tones, frequencies, pitch, and ranges that define the sound of an explosion. The processor may analyze these sounds and detect the sound of the explosion in order to further provide output via the TEG arrays and PEAs at the thermo-haptic mouse.

The method 1000 may further include generating thermo and haptic feedback signals with the processor at block 1035. As described herein, certain object interactions, actions, or other environmental characteristics may elicit different thermo-haptic signals upon input to a trained inference model for determining thermo-haptic feedback. Example thermo-haptic feedback signals are represented in Table 1. The thermo-haptic signals described in Table 1 may be specifically applicable to the first-person shooter gaming application described herein as an example and may be a result of a trained machine learning inference model for game action event environment for a particular gaming application. However, the execution of other gaming applications may elicit different intensities and patterns of activation of the TEG arrays and PEAs along with those presented in Table 1. Such other generated thermo-haptic signals are contemplated in the present specification.

The method 1000 may include, at 1040, activating the TEG arrays and PEAs of the thermo-haptic mouse according to the thermo-haptic signals generated by the processor. Again, the signals generated by the processor may be transmitted, either wirelessly or via a wire, to the mouse controller of the thermo-haptic mouse which may relay these signals to one or more TEG arrays or PEA. The duration of activation and timing of the activation of the TEG arrays and PEAs may vary based on the type of signal provided to the mouse controller according to, for example, Table 1. In an embodiment, the signals may indicate a single event thermo-haptic feedback, directional thermo-haptic feedback, or moving thermo-haptic feedback according to various embodiments. The nature of the haptic or thermo-electric feedback signals is a result of the game play images processed via the trained machine learning inference model for the specific gaming applications according to some embodiments. At this point the method 1000 may end. The present specification contemplates that the method 1000 may be iteratively executed when the processor is provided with any image recognition datasets as described herein and may not stop until execution of the gaming application is stopped.

The blocks of the flow diagrams of FIGS. 8 through 10 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
   a processor;
   a data storage device;
   a power management unit;
   a thermo-haptic mouse, including:
      an array of thermoelectric generators of a thermo-haptic module to selectively heat or cool a portion of the thermo-haptic mouse to be felt by a user of the thermo-haptic mouse; and
      a piezoelectric actuator of the thermo-haptic module to selectively apply a vibration to the portions of the thermo-haptic mouse to be felt by the user of the thermo-haptic mouse; and
   the processor executing code of a mouse training machine learning system to:
      receive, as training input, captured images during the execution of a gaming application; and
      provide, as output, image recognition dataset descriptive of recognized game action event environmental data during execution of the gaming application, the image recognition dataset to be used by the processor executing a thermo-haptic feedback model evaluation system to provide thermo-haptic signals to the array of thermoelectric generators and the piezoelectric actuator to provide thermo-haptic feedback commensurate with the game action event environment during game play.

2. The information handling system of claim 1, wherein the execution of the thermo-haptic feedback model evaluation system by the processor determines if a threshold accuracy of the output image recognition dataset has been reached before use of the output image recognition dataset by the processor for thermo-haptic feedback during execution of the gaming application.

3. The information handling system of claim 1, wherein the array of thermoelectric generators arranged within an interior of a portion of the thermo-haptic mouse provide a plurality of hot or cold thermal zones across a surface of the thermo-haptic mouse to be touched by the user when actuated.

4. The information handling system of claim 1, wherein the array of thermoelectric generators includes a flexible substrate to allow the thermoelectric generators to contour against an interior surface of a housing of the thermo-haptic mouse as a palm rest to be held by the user.

5. The information handling system of claim 1, further comprising:
   pairing a piezoelectric actuator with the array of thermoelectric generators in the thermo-haptic module, the piezoelectric actuator being placed below the array of thermoelectric generators sandwiching the thermoelectric generators between the piezoelectric actuators and an interior surface of a housing of the thermo-haptic mouse.

6. The information handling system of claim 1, the thermo-haptic mouse further comprising:
   a dedicated printed circuit board including a thermoelectric driver for the array of thermoelectric generators and a piezoelectric actuator driver for the piezoelectric actuator, the thermoelectric drivers and piezoelectric drivers operating via a controller on a mouse printed circuit board to receive the thermo-haptic signals.

7. The information handling system of claim 1, wherein each thermoelectric generator in the array of thermoelectric generators further comprises a series of p-doped and n-doped semiconductors to receive a voltage to selectively heat or cool one or more of the semiconductors.

8. A thermo-haptic feedback pointing device operatively coupled to an information handling system, comprising:
- at least one input button;
- a housing including a palm rest housing;
- and a motion tracking system to track movement of the thermo-haptic feedback pointing device;
- a controller to receive haptic feedback data from a processor of the information handling system;
- a thermoelectric driver operatively coupled to an array of thermoelectric generators to receive signals from the controller to selectively heat or cool portions of the thermo-haptic feedback pointing device to be felt by the user of the thermo-haptic feedback pointing device, the plurality of thermoelectric generators including a flexible substrate to allow the plurality of thermoelectric generators to contour against an interior surface of the palm rest housing of the thermo-haptic feedback pointing device; and
- a piezoelectric driver operatively coupled to a piezoelectric actuator to selectively apply a mechanical haptic feedback to the portions of the thermo-haptic feedback pointing device to be felt by the user of the thermo-haptic feedback pointing device, wherein the piezoelectric actuator is operatively coupled to the array of thermoelectric generators, the piezoelectric actuator being placed below the array of thermoelectric generators sandwiching the array of thermoelectric generators between the piezoelectric actuator and an interior surface of the palm rest housing of the thermo-haptic feedback pointing device;
- wherein the thermo-haptic feedback pointing device receives instructions to activate the piezoelectric actuator and array of thermoelectric generators corresponding to game action events of an executing gaming application originating from a haptic feedback machine learning system.

9. The thermo-haptic feedback pointing device of claim 8, further comprising:
- the piezoelectric actuator of a plurality of piezoelectric actuators paired to each array of thermoelectric generators of a plurality of arrays of thermoelectric generators, the piezoelectric actuators being placed below each array of thermoelectric generators sandwiching the arrays of thermoelectric generators between the piezoelectric actuators and an interior surface of the palm rest housing of the thermo-haptic feedback pointing device.

10. The thermo-haptic feedback pointing device of claim 8, further comprising:
- a dedicated printed circuit board including a plurality of thermoelectric drivers for each of the array of thermoelectric generators to render a thermo-haptic feedback across a plurality of arrays of thermoelectric generators.

11. The thermo-haptic feedback pointing device of claim 8, further comprising:
- a dedicated printed circuit board including a plurality of piezoelectric actuator drivers for each of a plurality of piezoelectric actuators to render a vibration haptic feedback across a plurality of piezoelectric actuators.

12. The thermo-haptic feedback pointing device of claim 8, further comprising a wired connection with the information handling system, the wired connection including signal and power lines to the controller of the thermo-haptic feedback pointing device.

13. The thermo-haptic feedback pointing device of claim 8, wherein the instructions to the thermo-haptic feedback pointing device originates from a haptic feedback machine learning system.

14. The thermo-haptic feedback pointing device of claim 8, further comprising:
- forming discrete heat and cold zones on a surface the housing of the thermo-haptic feedback pointing device by arranged plurality of arrays of thermoelectric generators against the interior surface of a palm rest housing of the thermo-haptic feedback pointing device to heat and cool one or more of the discrete heat and cold zones.

15. A thermo-haptic feedback pointing device operatively coupled to an information handling system, comprising:
- at least one input button;
- a housing including a palm rest housing;
- and a motion tracking system to track movement of the thermo-haptic feedback pointing device;
- a controller to receive haptic feedback data from a processor of the information handling system;
- a thermoelectric driver operatively coupled to an array of thermoelectric generator to receive signals from the controller to selectively heat or cool portions of the thermo-haptic feedback pointing device to be felt by the user of the thermo-haptic feedback pointing device corresponding to the haptic feedback data, the plurality of thermoelectric generators including a flexible substrate to allow the plurality of thermoelectric generators to contour against an interior surface of the palm rest housing of the thermo-haptic feedback pointing device; and
- a piezoelectric driver operatively coupled to a piezoelectric actuator to selectively apply a mechanical haptic feedback to the portions of the thermo-haptic feedback pointing device to be felt by the user of the thermo-haptic feedback pointing device corresponding to the haptic feedback data, wherein the piezoelectric actuator is operatively coupled to the array of thermoelectric generators, the piezoelectric actuator being placed below the array of thermoelectric generators sandwiching the array of thermoelectric generators between the piezoelectric actuator and an interior surface of the palm rest housing of the thermo-haptic feedback pointing device;
- a dedicated printed circuit board including:
  - a plurality of thermoelectric drivers for each of a plurality of arrays of thermoelectric generators to render the selective heating or cooling across a plurality of arrays of thermoelectric generators; and
  - a plurality of piezoelectric actuator drivers for each of a plurality of piezoelectric actuators to render the mechanical haptic feedback across a plurality of piezoelectric actuators.

16. The thermo-haptic feedback pointing device of claim 15, further comprising:
- the piezoelectric actuator of a plurality of piezoelectric actuators paired to each array of thermoelectric generators of a plurality of arrays of thermoelectric generators, the piezoelectric actuators being placed below each array of thermoelectric generators sandwiching the arrays of thermoelectric generators between the piezoelectric actuators and an interior surface of the palm rest housing of the thermo-haptic feedback pointing device.

17. The thermo-haptic feedback pointing device of claim 15, further comprising a wired connection with the information handling system, the wired connection including signal and power lines to the controller of the thermo-haptic feedback pointing device.

18. The thermo-haptic feedback pointing device of claim 15, further comprising:
   a wireless transceiver to send and receive data from the information handling system; and
a battery to power the controller, thermoelectric generators, and piezoelectric actuators.

19. The thermo-haptic feedback pointing device of claim 15, wherein discrete heat and cold zones are formed on a surface of the palm rest housing of the thermo-haptic feedback pointing device by arranging the plurality of thermoelectric generators against an interior surface of the housing of the thermo-haptic feedback pointing device to concurrently heat and cool one or more of the discrete hot and cold zones.

20. The thermo-haptic feedback pointing device of claim 15, wherein the thermo-haptic feedback pointing device receives instructions to activate the piezoelectric actuator and array of thermoelectric generators originating from a haptic feedback machine learning system inference model.

* * * * *